US012723120B2

(12) United States Patent
Saito

(10) Patent No.: US 12,723,120 B2
(45) **Date of Patent: *Sep. 1, 2026**

(54) CROSSLINKABLE ACRYLIC RUBBER COMPOSITION

(71) Applicant: UNIMATEC CO., LTD., Tokyo (JP)

(72) Inventor: Satoru Saito, Ibaraki (JP)

(73) Assignee: UNIMATEC CO., LTD., Tokyo (JP)

( * ) Notice: Subject to any disclaimer, the term of this patent is extended or adjusted under 35 U.S.C. 154(b) by 329 days.

This patent is subject to a terminal disclaimer.

(21) Appl. No.: 18/683,705

(22) PCT Filed: Jun. 17, 2022

(86) PCT No.: PCT/JP2022/024281

§ 371 (c)(1),
(2) Date: Feb. 14, 2024

(87) PCT Pub. No.: WO2023/021832

PCT Pub. Date: Feb. 23, 2023

(65) Prior Publication Data

US 2024/0360260 A1 Oct. 31, 2024

(30) Foreign Application Priority Data

Aug. 18, 2021 (JP) ................................ 2021-133264

(51) Int. Cl.

| | |
|---|---|
| ***C08F 222/16*** | (2006.01) |
| ***C08F 220/18*** | (2006.01) |
| ***C08F 222/38*** | (2006.01) |
| ***C08K 5/17*** | (2006.01) |
| ***C08K 5/46*** | (2006.01) |
| *F16L 11/04* | (2006.01) |

(52) U.S. Cl.

CPC ...... *C08F 220/1802* (2020.02); *C08F 222/16* (2013.01); *C08F 222/38* (2013.01); *C08K 5/17* (2013.01); *C08K 5/46* (2013.01); *F16L 11/04* (2013.01)

(58) Field of Classification Search

CPC C08F 220/36; C08F 220/26; C08F 220/1802; C08F 220/06; C08F 220/10; C08F 220/12; C08F 220/18; C08F 220/1804; C08L 33/08; C08L 33/14

See application file for complete search history.

(56) References Cited

U.S. PATENT DOCUMENTS

| | | | | |
|---|---|---|---|---|
| 5,134,200 | A | 7/1992 | Wideman | |
| 6,093,853 | A | 7/2000 | Nakagome et al. | |
| 6,329,551 | B1 | 12/2001 | Nakagome et al. | |
| 8,288,483 | B2 | 10/2012 | Ito et al. | |
| 8,609,753 | B2 * | 12/2013 | Ogawa | C07D 279/34 525/329.7 |
| 8,937,121 | B2 * | 1/2015 | Sakamoto | C07D 279/34 544/35 |
| 2002/0016508 | A1 | 2/2002 | Nakagome et al. | |
| 2005/0159519 | A1 | 7/2005 | Nakagome et al. | |
| 2005/0165191 | A1 * | 7/2005 | Kobayashi | C08F 220/12 526/319 |
| 2008/0071014 | A1 | 3/2008 | Ohishi et al. | |
| 2011/0040043 | A1 | 2/2011 | Ito et al. | |
| 2011/0301300 | A1 * | 12/2011 | Lizuka | C08C 19/02 525/379 |
| 2012/0302674 | A1 * | 11/2012 | Ogawa | C08K 5/3417 524/89 |
| 2012/0302675 | A1 * | 11/2012 | Sakamoto | C07D 209/88 544/35 |
| 2015/0087754 | A1 * | 3/2015 | Sakamoto | C07D 279/34 544/35 |
| 2022/0064430 | A1 | 3/2022 | Nakano et al. | |
| 2023/0322988 | A1 * | 10/2023 | Saito | C08F 220/1802 524/556 |

FOREIGN PATENT DOCUMENTS

| | | | | |
|---|---|---|---|---|
| EP | 0 556 727 | A1 | 8/1993 | |
| EP | 2053089 | A1 * | 4/2009 | C08K 5/0025 |
| JP | 04-264106 | A | 9/1992 | |
| JP | 05-230132 | A | 9/1993 | |
| JP | 11-021411 | A | 1/1999 | |
| JP | 2009036960 | A * | 2/2009 | |
| JP | 2009-209268 | A | 9/2009 | |

(Continued)

OTHER PUBLICATIONS

Machine translation into English of JP-2009036960-A (Year: 2009).*

(Continued)

*Primary Examiner* — Karuna P Reddy

(74) *Attorney, Agent, or Firm* — GREENBLUM & BERNSTEIN, P.L.C.

(57) ABSTRACT

A crosslinkable acrylic rubber composition containing: (A) acrylic rubber containing a carbamic acid ester group and a carboxyl group; (B) a phenothiazine-based antioxidant represented by formula [I], wherein $R^3$ is a hydrogen atom, a monovalent aliphatic hydrocarbon group having 1 to 20 carbon atoms, an aralkyl group having 7 to 20 carbon atoms, or an acyl group represented by formula II, wherein $R^4$ is a monovalent aliphatic hydrocarbon group having 1 to 20 carbon atoms, and $R^5$ is an aralkyl group having 7 to 20 carbon atoms; and (C) a crosslinking accelerator.

[I]

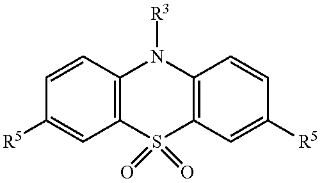

[II]

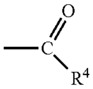

7 Claims, 5 Drawing Sheets

(56) References Cited

FOREIGN PATENT DOCUMENTS

| | | | |
|---|---|---|---|
| JP | 2010-235955 | A | 10/2010 |
| JP | 2010-254579 | A | 11/2010 |
| JP | 2015-227402 | A | 12/2015 |
| JP | 2020-111552 | A | 7/2020 |
| WO | 2006/001299 | A1 | 1/2006 |
| WO | 2011/058918 | A1 | 5/2011 |
| WO | 2011/093443 | A1 | 8/2011 |
| WO | 2020/158132 | A1 | 8/2020 |
| WO | 2022/049958 | A1 | 3/2022 |

OTHER PUBLICATIONS

Horvath, "High Performance Nitrile Rubber Automotive Fuel Hose", Rubber Chemistry and Technology, vol. 52, 1979, pp. 883-894.
Igarashi et al., "Water-developable Base-amplifying Copolymers", Journal of Photopolymer Science and Technology, vol. 18, No. 3, 2005, pp. 419-420.
Igarashi et al., "Novel Water-developable Photoimaging Materials Consisting of Base-amplifying Polymers and a Photobase Generator", Materials Technology, vol. 25, No. 6, 2007, pp. 285-293.
Meyer et al., "Emulsion Rubbers Copolymerized With Monomeric Antioxidants", Rubber Chemistry and Technology, vol. 46, 1973, pp. 106-114.
ISR issued in International Patent Application No. PCT/JP2022/024281, Aug. 30, 2022, translation.
IPRP issued in International Patent Application No. PCT/JP2022/024281, Feb. 13, 2024, translation.

* cited by examiner

[Fig. 1]
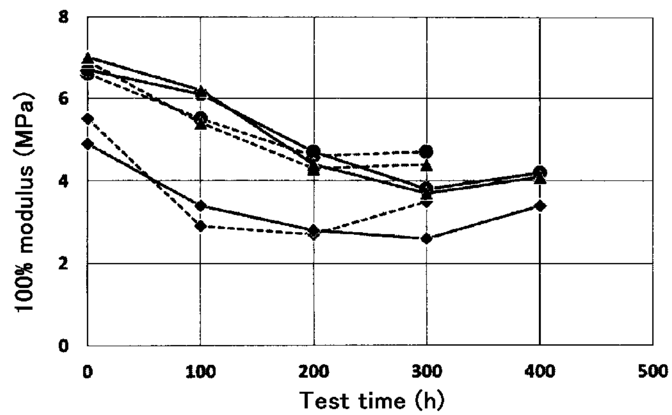
[Fig. 2]
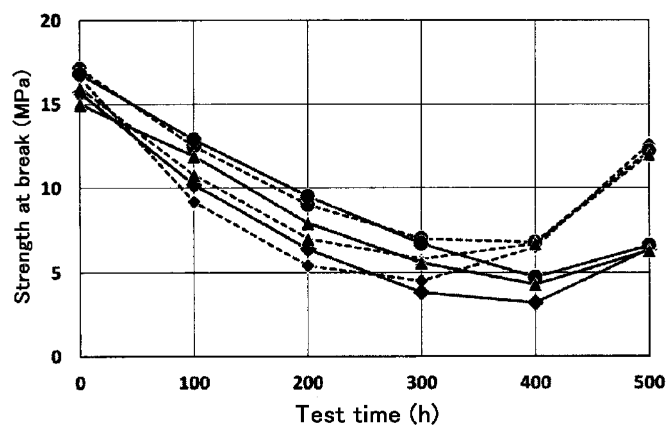
[Fig. 3]
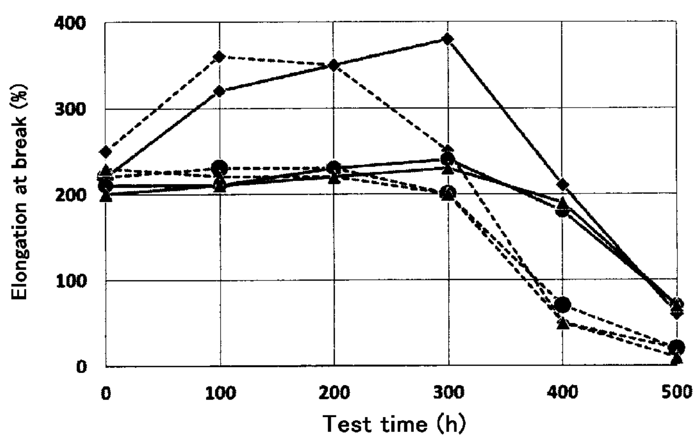

[Fig. 4]
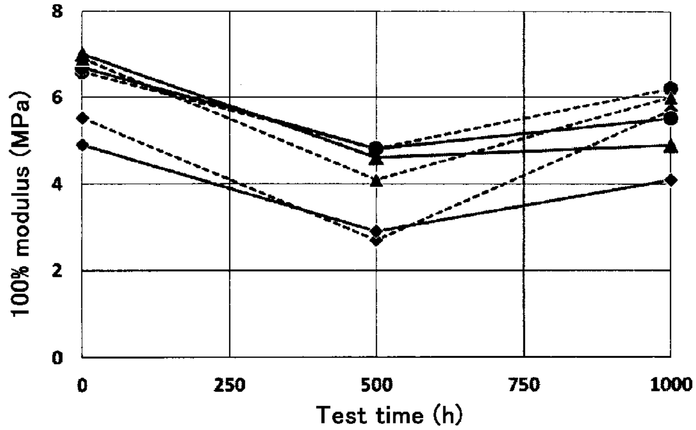
[Fig. 5]
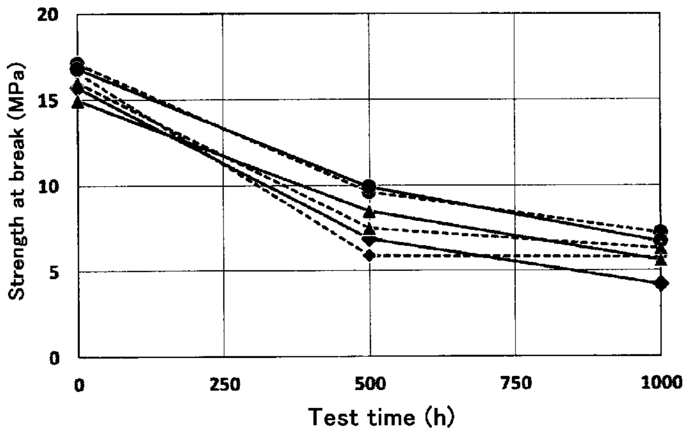
[Fig. 6]
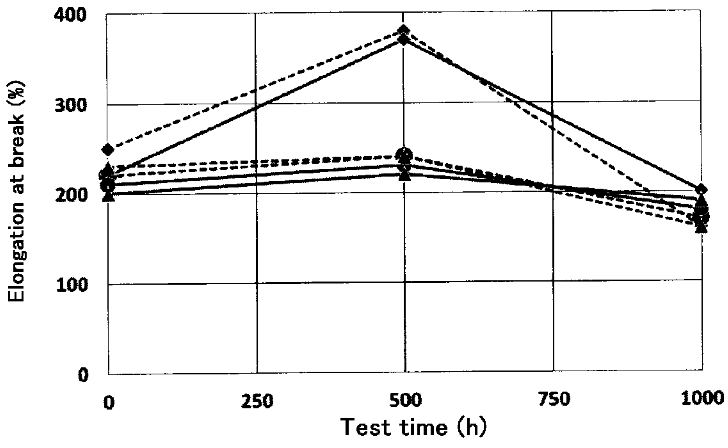

[Fig. 7]
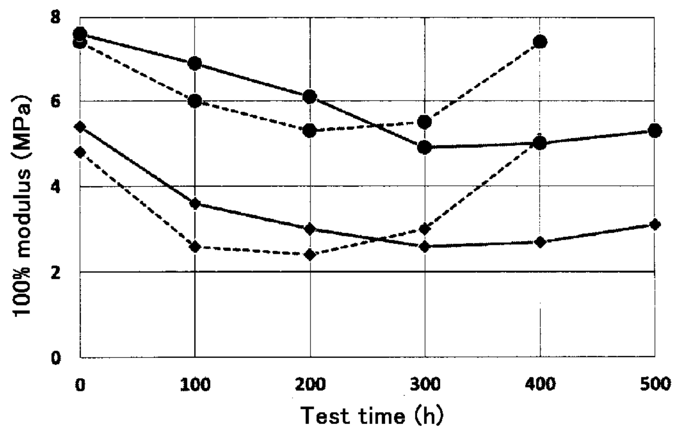
[Fig. 8]
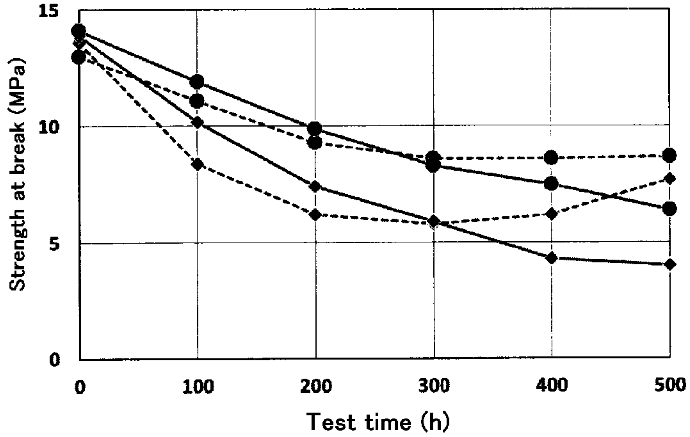
[Fig. 9]
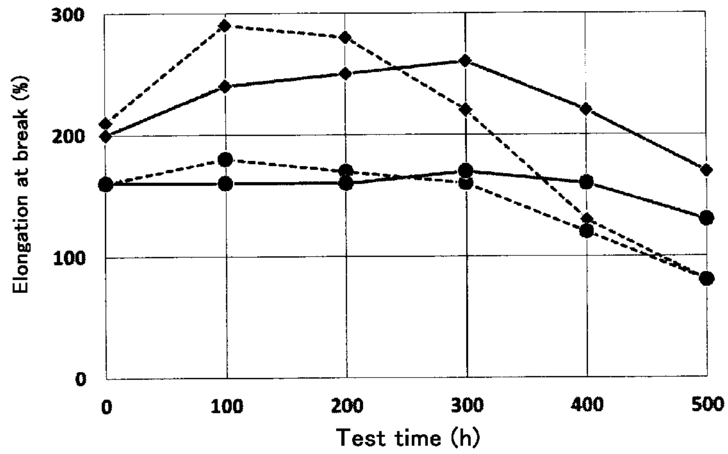

[Fig. 10]
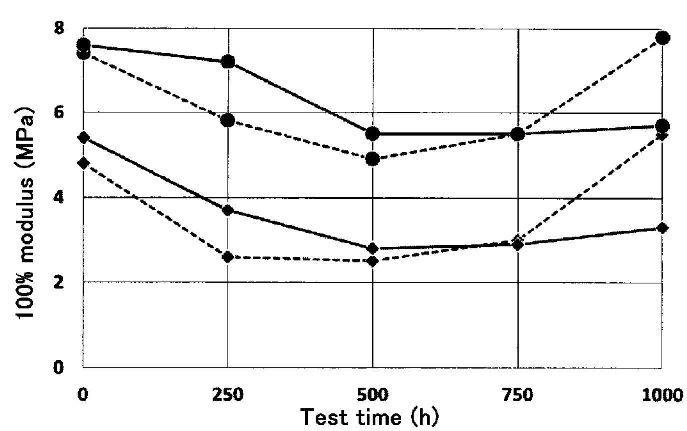
[Fig. 11]
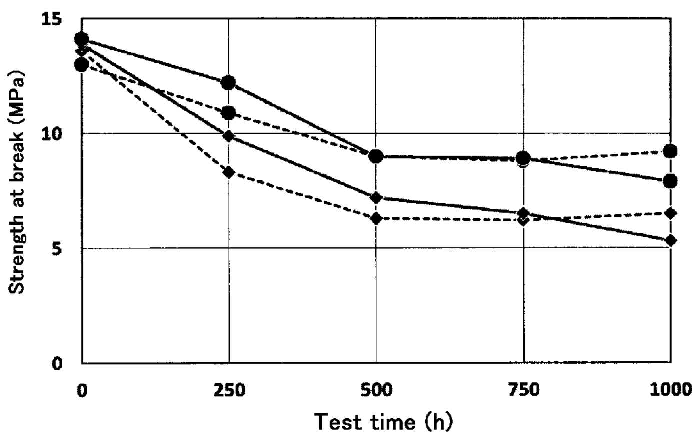
[Fig. 12]
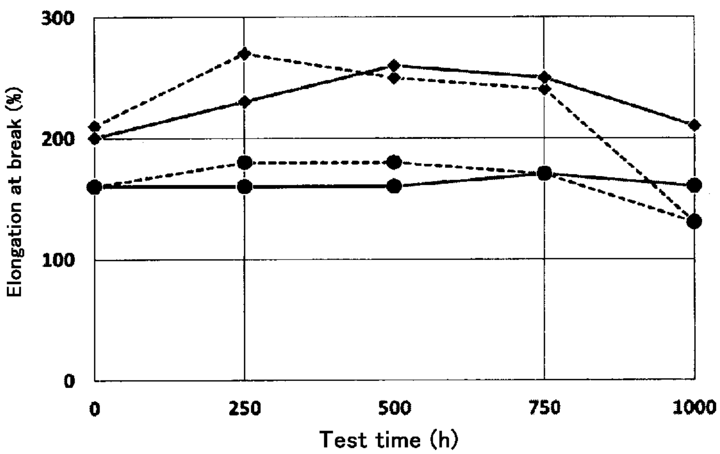

[Fig. 13]
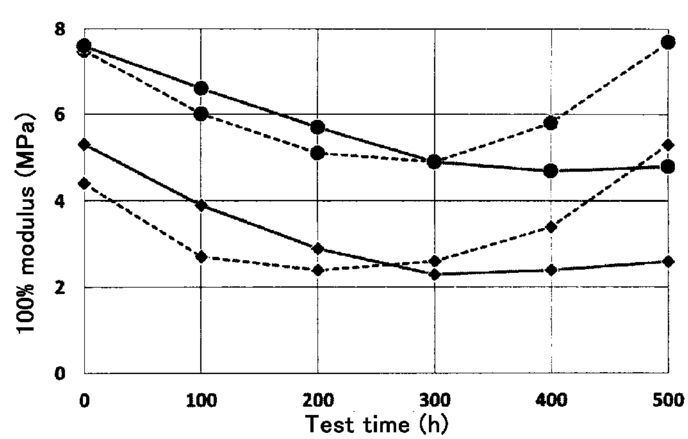
[Fig. 14]
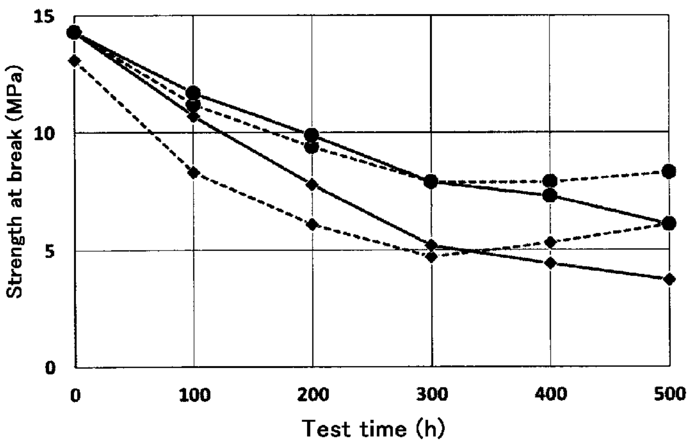
[Fig. 15]
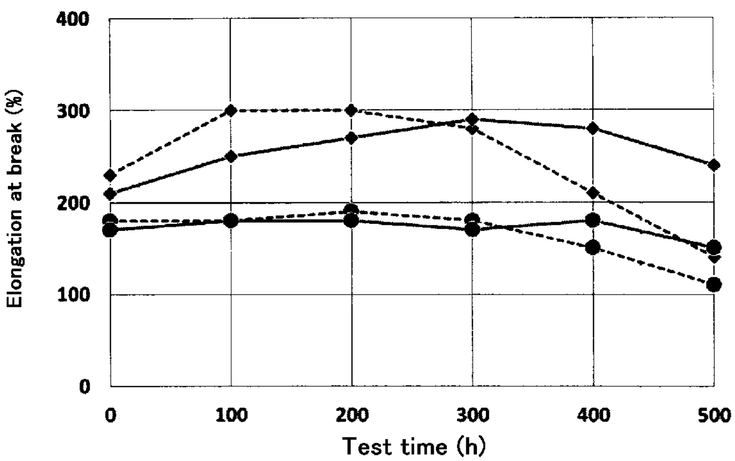

CROSSLINKABLE ACRYLIC RUBBER COMPOSITION

TECHNICAL FIELD

The present invention relates to a crosslinkable acrylic rubber composition. More particularly, the present invention relates to a crosslinkable acrylic rubber composition that can minimize the decrease in the mechanical properties of a crosslinked product due to thermal oxidative degradation.

BACKGROUND ART

From the perspective of global climate change countermeasures and efficient use of energy, emission regulations for carbon dioxide and NOx gases emitted from internal combustion engines, typified by automobile engines, tend to be more stringent. As a countermeasure thereof, automobile engines are required to have higher output, higher thermal efficiency, and lower and harmless emissions. This tends to increase the temperature in the engine compartment. Along with this trend, polymer materials, such as rubber and plastic, used in the surrounding area are required to have further improved heat resistance.

As specific examples, vehicles equipped with a turbocharger system for the purpose of improving the fuel efficiency of the engine are becoming widespread. Since air guided from the turbocharger to the intercooler and engine has high temperature and high pressure, high heat resistance is required for rubber hose materials that transport the air.

Thus, with the demand for higher temperatures and longer life for polymer materials used in automobile engines, as countermeasures thereof, for example, efforts are being made to improve the heat resistance of the raw material rubber itself of rubber product parts, and appropriate antioxidants are being added to rubber product parts.

As typical antioxidants of rubber members, phenol-based antioxidants and amine-based antioxidants are used. In particular, amine-based antioxidants are used for rubber members used in higher temperature environments.

For example, in the case of acrylic rubber, amine-based antioxidants typified by 4,4'-bis(α,α-dimethylbenzyl)diphenylamine are used as antioxidants (Patent Documents 1 to 4).

Further, as an effort to improve the heat resistance of the acrylic rubber itself, the crosslinking site monomer is changed from an active chlorine-containing unsaturated monomer to an α,β-unsaturated carboxylic acid monomer, thereby forming a strong crosslinking structure that can withstand use in high temperature environments.

However, even improvement the heat resistance of the raw material rubber itself, and amine-based antioxidants cannot fully satisfy the recent heat resistance requirements.

In recent years, phenothiazine-based antioxidants are said to be effective as antioxidants for rubber materials, in Patent Document 5.

As a rubber material that has excellent vulcanization characteristics, mechanical characteristics, and heat aging characteristics, and that is particularly suitable for use in anti-vibration rubber, Patent Document 5 discloses one comprising (A) a diene-based rubber, (B) a bismaleimide compound, and (C) the following phenothiazine compound:

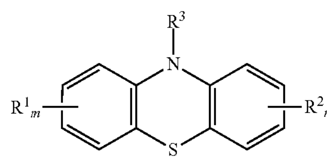

$R^1$, $R^2$: a hydrogen atom, a $C_1$-$C_8$ alkyl group that may be substituted with an aromatic ring, an alkoxy group, a halogen atom, or a cyano group $R^3$: a hydrogen atom, a $C_1$-$C_6$ chain or cyclic alkyl group, a vinyl group, or an aromatic group m, n: 0 to 2

A phenothiazine compound in which the sulfur atom at position 5 is $—SO_2—$ is also known and described, for example, in Patent Document 6.

Patent Document 6 discloses a condensed heterocyclic compound represented by the following general formula and an organic material composition comprising the same, and states that it is possible to impart high processing stability, heat resistance, and long life to organic materials such as polymer that is susceptible to oxidative, thermal, or photo-induced breakdown.

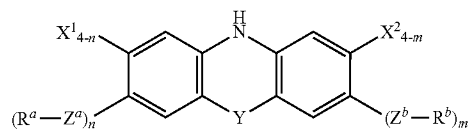

Y: a chemical single bond, —S(═O)—, or $—SO_2—$ $R^a$, $R^b$: a $C_1$-$C_{30}$ organic group that may have a substituent $Z^a$, $Z^b$: a chemical single bond or $—SO_2—$ $X^1$, $X^2$: a hydrogen atom, a halogen atom, an alkyl group, a cyano group, a nitro group, $—OR^1$, $—O—CO—R^1$, $—CO—OR^1$, $—O—CO—OR^1$, $—NR^2R^3$, $—NR^2—CO—R^1$, $—CO—NR^2R^3$, or $—O—CO—NR^2R^3$ n, m: 0 to 2, provided that one of them is not 0.

Moreover, in order to prevent the volatilization of amine-based antioxidants form rubber members, studies have been made on increasing the molecular weight and melting point of amine-based antioxidants. However, along with the increase in the molecular weight and melting point of antioxidants, there are problems such as reducing dispersibility in rubber and transferability inside rubber.

For the purpose of preventing the volatilization of antioxidants and extending the life of rubber parts in high temperature environments, a method of copolymerizing raw material rubber with an antioxidant having a polymerizable unsaturated group has also been examined (Patent Document 7).

For example, in Non-Patent Documents 1 and 2, Nocrac G-1 (produced by Ouchi Shinko Chemical Industrial Co., Ltd.) and APMA (produced by Seiko Chemical Co., Ltd.) are exemplified as antioxidants having a polymerizable unsaturated group.

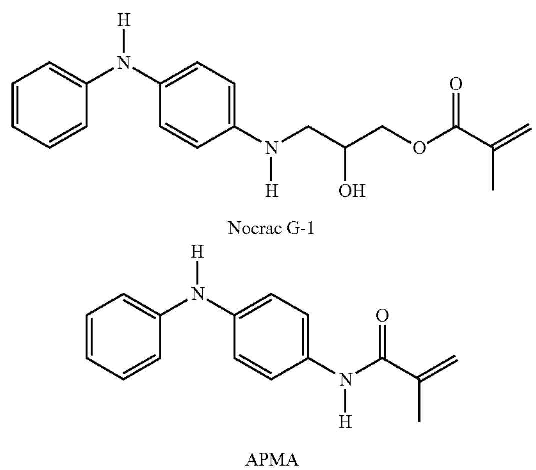

Nocrac G-1

APMA

However, with the above antioxidants, radical copolymerization with a polymerizable unsaturated monomer is practically difficult due to the radical polymerization inhibitory effect of the diphenylamino group.

Moreover, several methods are disclosed for introducing a diphenylamino structure into a polymer by the modification reaction of elastomeric polymer. For example, the following methods are known: a method in which a diphenylamino group is introduced after hydroformylation of the side chain of an elastomer having an olefine-based unsaturated group (Patent Document 8), and a method in which a diphenylamino group is introduced after maleic anhydride is added to a diene-based copolymer in the presence of a free radical generator (Patent Document 9). However, these methods further require a modification step of introducing a diphenylamino group after producing a base copolymer, which is not practical in terms of production cost.

Further, a method of crosslinking acrylic rubber in coexistence with 4-aminodiphenylamine is known (Patent Document 10); however, there is concern for this method that 4-aminodiphenylamine may some inhibit polyamine crosslinking in some degree.

In conventional technologies, none of the methods of improvement in the heat resistance of the raw material rubber itself, improvement in the performance of various antioxidants, and chemical bonding of thermal antioxidant components to the raw material rubber can fully satisfy the recent heat resistance requirements.

PRIOR ART DOCUMENT

Patent Document

Patent Document 1: JP-A-11-21411
Patent Document 2: WO 2011/58918 A1
Patent Document 3: JP-A-2010-254579
Patent Document 4: WO 2006/001299 A1
Patent Document 5: JP-A-2015-227402
Patent Document 6: WO 2011/093443 A1
Patent Document 7: JP-A-2009-209268
Patent Document 8: JP-A-4-264106
Patent Document 9: JP-A-5-230132
Patent Document 10: WO 2020/158132 A1
Patent Document 11: JP-A-2009-036960
Patent Document 12: JP-A-2010-235955
Patent Document 13: JP-A-2020-111552

Non-Patent Documents

Non-Patent Document 1: Rubber Chem. Technol., Vol. 46, pp. 106 (1973)
Non-Patent Document 2: Rubber Chem. Technol., Vol. 52, pp. 883 (1979)
Non-Patent Document 3: Journal of Photopolymer Science and Technology, Vol. 18, Number 3, pp. 419 (2005)
Non-Patent Document 4: Material Technology, Vol. 25, Number 6, pp. 285 (2007)

To address the above problems, the present inventors examined whether a crosslinkable acrylic rubber composition comprising acrylic rubber containing a carbamic acid ester group and a carboxyl group, a phenothiazine-based antioxidant, and a crosslinking accelerator can be used to improve the heat resistance of the acrylic rubber. In particular, the examination was carried out for the purpose of suppressing significant softening degradation of acrylic rubber comprising ethyl acrylate as a main raw material observed in the early stage of thermal oxidative degradation, and significant hardening degradation observed in the later stage thereof.

OUTLINE OF THE INVENTION

Problem to be Solved by the Invention

An object of the present invention is to provide a crosslinkable acrylic rubber composition that can suppress significant softening degradation of an acrylic rubber crosslinked product observed in the early stage of thermal oxidative degradation and hardening degradation observed in the later stage thereof, and that can minimize the decrease in its mechanical strength.

Means for Solving the Problem

The above object of the present invention can be achieved by a crosslinkable acrylic rubber composition comprising:

(A) acrylic rubber containing a carbamic acid ester group and a carboxyl group;

(B) a phenothiazine-based antioxidant represented by the following general formula [I]:

[I]

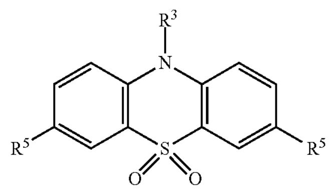

[wherein $R^3$ is a hydrogen atom, a monovalent aliphatic hydrocarbon group having 1 to 20 carbon atoms, an aralkyl group having 7 to 20 carbon atoms, or an acyl group represented by the following general formula:

(II)

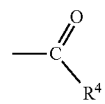

(wherein $R^4$ is a monovalent aliphatic hydrocarbon group having 1 to 20 carbon atoms), and $R^5$ is an aralkyl group having 7 to 20 carbon atoms]; and (C) a crosslinking accelerator.

Effect of the Invention

The following figure schematically shows an example of the crosslinking reaction of acrylic rubber constituting the acrylic rubber composition according to the present invention.

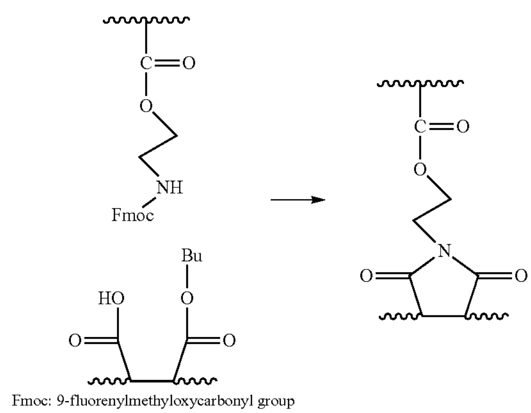

Fmoc: 9-fluorenylmethyloxycarbonyl group

In the crosslinking of the acrylic rubber composition, the carbamic ester group is decomposed by heat and the action of a nitrogen-containing basic organic compound to liberate the amino group, and then reacts with the active site derived from an α,β-unsaturated carboxylic acid monomer to form a complementary crosslinked structure. Such a specific crosslinked structure exhibits an effect of suppressing significant softening degradation of the acrylic rubber crosslinked product in the early stage of thermal oxidative degradation.

Further, the phenothiazine-based antioxidant constituting the composition of the present invention exhibits an effect of suppressing significant hardening degradation of the acrylic rubber crosslinked product having the specific crosslinked structure shown above in the later stage of thermal oxidative degradation.

In particular, it is effective in suppressing significant softening degradation of acrylic rubber comprising ethyl acrylate as a main raw material observed in the early stage of thermal oxidative degradation, and significant hardening degradation observed in the later stage thereof.

Further, since crosslinking is possible without the addition of an aromatic or aliphatic polyamine crosslinking agent in the production of the crosslinkable composition, the process of newly adding a crosslinking agent can be omitted, and additional effects can also be expected, such as eliminating the risk of poor dispersion of the crosslinking agent in the acrylic rubber.

(Meth)acrylate copolymers containing a carbamic acid ester group are described in Patent Document 11 and Non-Patent Documents 3 and 4. Further, Patent Document 12 indicates that it is possible to crosslink carboxyl group-containing acrylic rubber using a dicarbamic acid ester compound. However, there is no indication or suggestion that an acrylic rubber crosslinked product having a specific crosslinked structure can be obtained by using them in combination.

Further, the phenothiazine-based antioxidant described in Patent Document 6 is very effective in suppressing hardening degradation of an acrylic rubber crosslinked product in the later stage of thermal oxidative degradation; however, softening degradation progresses throughout the thermal oxidative degradation process, and insufficient mechanical strength may become a problem.

In addition, the effectiveness of the phenothiazine-based antioxidant on the acrylic rubber crosslinked product having the above crosslinked structure is nowhere described.

BRIEF DESCRIPTION OF DRAWINGS

FIG. 1: a schematic diagram of the 100% modulus change over time of acrylic rubber crosslinked product at 190° C. (Example 1: -●-, Comparative Example 1: --●--, Example 5: -▲-, Comparative Example 2: --▲--, Comparative Example 3: -◆-, Comparative Example 7: --◆--; FIGS. 1 to 6 common).

FIG. 2: a schematic diagram of the strength at break change over time of acrylic rubber crosslinked product at 190° C.

FIG. 3: a schematic diagram of the elongation at break change over time of acrylic rubber crosslinked product at 190° C.

FIG. 4: a schematic diagram of the 100% modulus change over time of acrylic rubber crosslinked product at 175° C.

FIG. 5: a schematic diagram of the strength at break change over time of acrylic rubber crosslinked product at 175° C.

FIG. 6: a schematic diagram of the elongation at break change over time of acrylic rubber crosslinked product at 175° C.

FIG. 7: a schematic diagram of the 100% modulus change over time of acrylic rubber crosslinked product at 190° C. (Example 10: -●-, Comparative Example 8: --●- -, Comparative Example 10: -◆-, Comparative Example 12: --◆--, FIGS. 7 to 12 common).

FIG. 8: a schematic diagram of the strength at break change over time of acrylic rubber crosslinked product at 190° C.

FIG. 9: a schematic diagram of the elongation at break change over time of acrylic rubber crosslinked product at 190° C.

FIG. 10: a schematic diagram of the 100% modulus change over time of acrylic rubber crosslinked product at 175° C.

FIG. 11: a schematic diagram of the strength at break change over time of acrylic rubber crosslinked product at 175° C.

FIG. 12: a schematic diagram of the elongation at break change over time of acrylic rubber crosslinked product at 175° C.

FIG. 13: a schematic diagram of the 100% modulus change over time of acrylic rubber crosslinked product at 190° C. (Example 12: -●-, Comparative Example 13: --●--, Comparative Example 14: -◆-, Comparative Example 15: --◆--; FIGS. 13 to 15 common).

FIG. 14: a schematic diagram of the strength at break change over time of acrylic rubber crosslinked product at 190° C.

FIG. 15: a schematic diagram of the elongation at break change over time of acrylic rubber crosslinked product at 190° C.

EMBODIMENTS FOR CARRYING OUT THE INVENTION

The crosslinkable acrylic rubber composition of the present invention is constituted of (A) acrylic rubber containing a carbamic acid ester group and a carboxyl group;

(B) a phenothiazine-based antioxidant represented by the following general formula [I]:

(I)

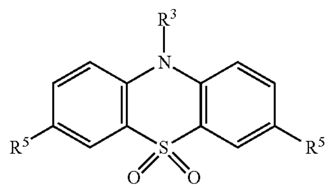

[wherein $R^3$ is a hydrogen atom, a monovalent aliphatic hydrocarbon group having 1 to 20 carbon atoms, an aralkyl group having 7 to 20 carbon atoms, or an acyl group represented by the following general formula:

(II)

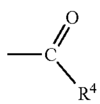

(wherein $R^4$ is a monovalent aliphatic hydrocarbon group having 1 to 20 carbon atoms), and $R^5$ is an aralkyl group having 7 to 20 carbon atoms]; and (C) a crosslinking accelerator.

As the component (A), either of the following is used:

embodiment (A-1): acrylic rubber in which 90 to 99.8 wt % of an alkyl (meth)acrylate and/or alkoxyalkyl (meth) acrylate monomer, 0.1 to 5 wt % of an α,β-unsaturated carboxylic acid monomer, and 0.1 to 5 wt % of a carbamic acid ester group-containing (meth)acrylate monomer represented by the general formula:

(III)

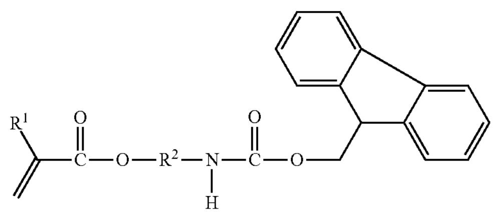

(wherein $R^1$ is a hydrogen atom or a methyl group, and $R^2$ is a divalent aliphatic hydrocarbon group having 1 to 10 carbon atoms) are copolymerized in comonomer ratio; or embodiment (A-2): a mixture of acrylic rubber (i) in which 90 to 99.9 wt % of an alkyl (meth)acrylate and/or alkoxyalkyl (meth)acrylate monomer and 0.1 to 10 wt % of a carbamic acid ester group-containing (meth)acrylate monomer represented by the general formula [III] are copolymerized in comonomer ratio and acrylic rubber (ii) in which 90 to 99.9 wt % of an alkyl (meth)acrylate and/or alkoxyalkyl (meth)acrylate monomer and 0.1 to 10 wt % of an α,β-unsaturated carboxylic acid monomer are copolymerized in comonomer ratio, wherein the weight ratio of each component is 90 to 10 wt % and 10 to 90 wt %. Here, the term (meth)acrylate refers to acrylate or methacrylate.

The embodiment (A-1) comprising single acrylic rubber is one in which 99.8 to 90 wt %, preferably 99 to 90 wt %, of an alkyl (meth)acrylate monomer and/or an alkoxyalkyl (meth)acrylate monomer, 0.1 to 5 wt %, preferably 0.5 to 5 wt %, of an α,β-unsaturated carboxylic acid monomer, and 0.1 to 5 wt %, preferably 0.5 to 5 wt %, of a carbamic acid ester group-containing (meth)acrylate monomer are copolymerized in comonomer ratio.

A rough estimate of the ratio of the weight fraction composition of the carbamic acid ester group-containing (meth)acrylate monomer and the weight fraction composition of the α,β-unsaturated carboxylic acid monomer in the acrylic rubber of the embodiment (A-1) can be determined by $w_{CA}/M_{CA}=w_{NH2}/M_{NH2}$. These proportions can be suitably adjusted in consideration of factors, such as the crosslinking rate and the various physical properties of the crosslinked product.

$w_{CA}$ (wt %): weight fraction composition of the α,β-unsaturated carboxylic acid monomer in the acrylic rubber $M_{CA}$ (g/mol): molecular weight of the α,β-unsaturated carboxylic acid monomer $w_{NH2}$ (wt %): weight fraction composition of the carbamic acid ester group-containing (meth)acrylate monomer in the acrylic rubber $M_{NH2}$ (g/mol): molecular weight of the carbamic acid ester group-containing (meth)acrylate monomer Usable examples of the acrylic rubber of the embodiment (A-1) other than the above include an elastomeric copolymer comprising ethylene, methyl acrylate, a carbamic acid ester group-containing (meth)acrylate monomer, and an α,β-unsaturated carboxylic acid monomer as main constituent components, an elastomeric copolymer comprising ethylene, vinyl acetate, a carbamic acid ester group-containing (meth)acrylate monomer, and an α,β-unsaturated carboxylic acid monomer as main constituent components, and the like.

The acrylic rubber (i) used in the embodiment (A-2) comprising a mixture of acrylic rubbers is one in which 99.9 to 90 wt %, preferably 99.5 to 95 wt %, of an alkyl (meth)acrylate monomer and/or an alkoxyalkyl (meth)acrylate monomer and 0.1 to 10 wt %, preferably 0.5 to 5 wt %, of a carbamic acid ester group-containing (meth)acrylate monomer are copolymerized in comonomer ratio.

Further, the acrylic rubber (ii) used is one in which 99.9 to 90 wt %, preferably 99.5 to 95 wt %, of an alkyl (meth)acrylate monomer and/or alkoxyalkyl (meth)acrylate monomer and 0.1 to 10 wt %, preferably 0.5 to 5 wt %, of an α,β-unsaturated carboxylic acid monomer are copolymerized in comonomer ratio. The mixing proportions of the acrylic rubber (i) and the acrylic rubber (ii) are each set to 90 to 10 wt % and 10 to 90 wt %, in consideration of the active site stoichiometry amount of the carbamic acid ester group and α,β-unsaturated carboxylic acid monomers contained in the mixture.

A rough estimate of the weight ratio of the acrylic rubber (i) and acrylic rubber (ii) in the acrylic rubber mixture of the embodiment (A-2) is determined by $W_{(i)}\times w_{(i)NH2}/M_{(i)NH2}=W_{(ii)}\times w_{(ii)CA}/M_{(ii)CA}$. These proportions can be suitably adjusted in consideration of factors, such as the crosslinking rate and the various physical properties of the crosslinked product.

$W_{(i)}$ (parts by weight): weight of the acrylic rubber (i)

$w_{(i)NH2}$ (wt %): weight fraction composition of the carbamic acid ester group-containing (meth)acrylate monomer in the acrylic rubber (i)

$M_{(i)NH2}$ (g/mol): molecular weight of the carbamic acid ester group-containing (meth)acrylate monomer $W_{(ii)}$ (parts by weight): weight of the acrylic rubber (ii)

$w_{(ii)CA}$ (wt %): weight fraction composition of the α,β-unsaturated carboxylic acid monomer in the acrylic rubber (ii)

$M_{(ii)CA}$ (g/mol): molecular weight of the α,β-unsaturated carboxylic acid monomer The acrylic rubber mixture (A-2) can be easily prepared by mixing the acrylic rubber (i) and the acrylic rubber (ii) using an open roll, a kneader, a Banbury mixer, or the like.

Alternatively, the desired acrylic rubber mixture can also be prepared by mixing a water-based latex of the acrylic rubber (i) and a water-based latex of the of the acrylic rubber (ii) in any proportion, followed by coagulation with an aqueous electrolyte solution and drying.

Usable examples of the acrylic rubber (i) other than the above include an elastomeric copolymer comprising ethylene, methyl acrylate, and a carbamic acid ester group-containing (meth)acrylate monomer as main constituent components, an elastomeric copolymer comprising ethylene, vinyl acetate, and a carbamic acid ester group-containing (meth)acrylate monomer as main constituent components, and the like.

Usable examples of the acrylic rubber (ii) other than the above include an elastomeric copolymer comprising ethylene, methyl acrylate, and an α,β-unsaturated carboxylic acid monomer as main constituent components, an elastomeric copolymer comprising ethylene, vinyl acetate, and an α,β-unsaturated carboxylic acid monomer as main constituent components, and the like.

Each of the monomers constituting the single acrylic rubber of the embodiment (A-1) and the acrylic rubbers (i) and (ii) of the embodiment (A-2) are as shown below.

As the alkyl (meth)acrylate monomer and/or alkoxyalkyl (meth)acrylate monomer as the monomer units of the acrylic rubber of the embodiment (A-1) and the acrylic rubbers (i) and (ii) of the embodiment (A-2), at least one (meth)acrylate selected from alkyl (meth)acrylate containing an alkyl group having 1 to 8 carbon atoms, aralkyl (meth)acrylate containing an aralkyl group having 7 to 20 carbon atoms, and alkoxyalkyl (meth)acrylate containing an alkoxyalkyl group having 2 to 8 carbon atoms is used.

Examples of alkyl (meth)acrylate include methyl (meth) acrylate, ethyl (meth)acrylate, propyl (meth)acrylate, isopropyl (meth)acrylate, n-butyl (meth)acrylate, n-hexyl (meth)acrylate, 2-ethylhexyl (meth)acrylate, n-octyl (meth) acrylate, cyclohexyl (meth)acrylate, and the like are used. Preferable are ethyl acrylate or monomer mixture comprising the same.

Examples of aralkyl (meth)acrylate include benzyl (meth) acrylate and the like.

Moreover, examples of alkoxyalkyl (meth)acrylate include methoxymethyl (meth)acrylate, methoxyethyl (meth)acrylate, ethoxyethyl (meth)acrylate, n-butoxyethyl (meth)acrylate, ethoxypropyl (meth)acrylate, methoxyethoxyethyl (meth)acrylate, ethoxyethoxyethyl (meth)acrylate and the like.

Moreover, other than the main components (monomers) of the acrylic rubber of the embodiment (A-1) and the acrylic rubbers (i) and (ii) of the embodiment (A-2), the following polymerizable unsaturated monomers can be used as sub-components, if necessary.

Examples of polymerizable unsaturated monomer include styrene, α-methylstyrene, 3-methylstyrene, 4-methylstyrene, 1-vinylnaphthalene, 2-vinylnaphthalene, acrylonitrile, methacrylonitrile, acrylic acid amide, vinyl acetate, methyl vinyl ether, ethyl vinyl ether, ethylene, propylene, piperylene, butadiene, isoprene, chloroprene, cyclopentadiene, vinyl chloride, vinylidene chloride, and the like.

Specific examples of the (meth)acrylate monomer having a carbamic acid ester group represented by the general formula [III] as the monomer unit of the acrylic rubber of the embodiment (A-1) and the acrylic rubber (i) of the embodiment (A-2) include the following:

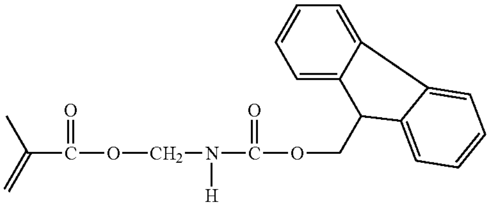

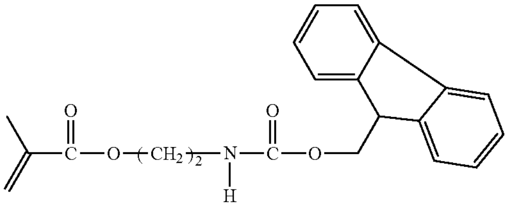

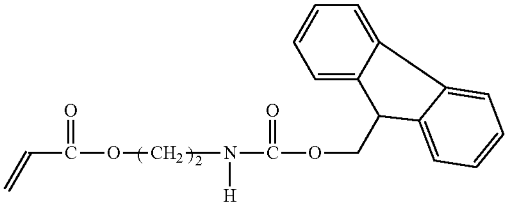

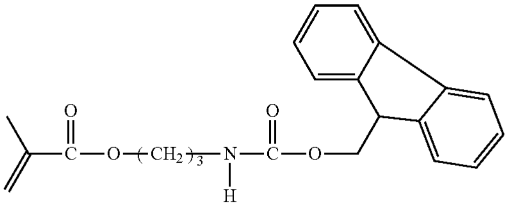

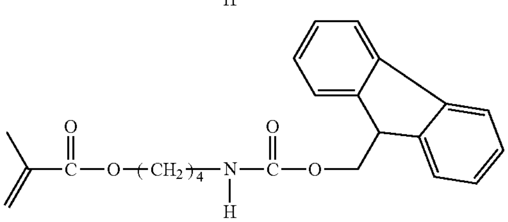

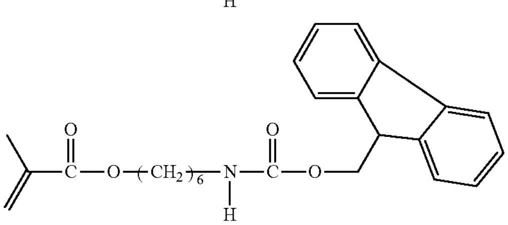

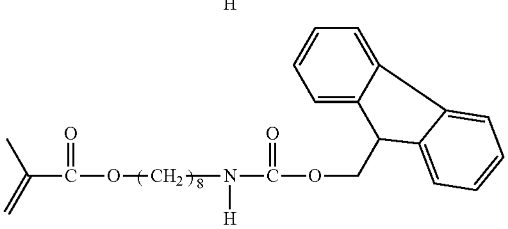

-continued

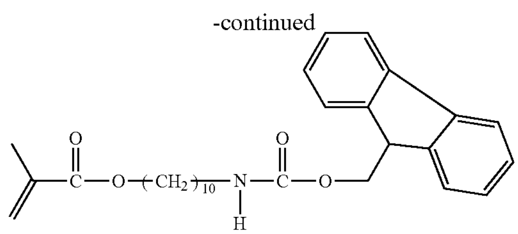

In terms of ease of production, the following monomer is preferably used:

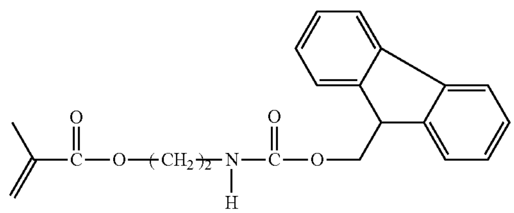

The (meth)acrylate monomer having a carbamic acid ester group represented by the general formula [III] can be easily produced by reacting isocyanatoalkyl acrylate or isocyanatoalkyl (meth)acrylate with 9-fluorenylmethanol in the presence of a urethanization reaction catalyst.

As the urethanization reaction catalyst, an organic tin compound, an organic titanium compound, an organic zirconium compound, or an organic bismuth compound can be used.

Examples of organic tin compounds include dibutyltin dilaurate, tin bis(2-ethylhexanoate), dibutyltin (2,4-pentanedionate), and the like.

Examples of organic titanium compounds include titanium diisopropoxy bis(ethylacetoacetate) and the like.

Examples of organic zirconium compounds include zirconium dibutoxybis(ethylacetate), zirconium tetra(acetylacetate), and the like.

Examples of organic bismuth compounds include bismuth tris(neodecanoate) and the like.

The reaction is carried out in an organic solvent, such as benzene, toluene, dioxane, methyl ethyl ketone, or cyclohexane, at a temperature of 40 to 80° C.

The α,β-unsaturated carboxylic acid monomer as the monomer unit of the acrylic rubber of the embodiment (A-1) and the acrylic rubber (ii) of the embodiment (A-2) is, for example, monobasic acid α,β-unsaturated carboxylic acid, dibasic acid α,β-unsaturated carboxylic acid, or a dibasic acid α,β-unsaturated carboxylic acid monoalkyl ester; a dibasic acid α,β-unsaturated carboxylic acid monoalkyl ester is preferably used.

Examples of monobasic α,β-unsaturated carboxylic acid include acrylic acid, methacrylic acid.

Examples of dibasic α,β-unsaturated carboxylic acid include maleic acid, maleic anhydride, fumaric acid, itaconic acid, citraconic acid and the like.

Examples of dibasic α,β-unsaturated carboxylic acid monoalkyl ester include monoalkyl esters of maleic acid, fumaric acid, itaconic acid, and citraconic acid. Specific examples include monomethyl maleate, monoethyl maleate, mono n-propyl maleate, monoisopropyl maleate, mono n-butyl maleate, monoisobutyl maleate, mono n-hexyl maleate, monocyclohexyl maleate, monomethyl fumarate, monoethyl fumarate, mono n-propyl fumarate, monoisopropyl fumarate, mono n-butyl fumarate, monoisobutyl fumarate, mono n-hexyl fumarate, monocyclohexyl fumarate, and the like.

The acrylic rubber of the embodiment (A-1) and the acrylic rubbers (i) and (ii) of the embodiment (A-2) are produced by a general method for polymerizing acrylic rubber. The copolymerization reaction can be carried out by any method, such as an emulsion polymerization method, a suspension polymerization method, a solution polymerization method, or a bulk polymerization method. Preferably, an emulsion polymerization method or a suspension polymerization method is used, and the reaction is carried out at a temperature of about −10 to 100° C., preferably about 5 to 80° C.

Examples of the polymerization initiator for the reaction include organic peroxides or hydroperoxides, such as benzoyl peroxide, dicumyl peroxide, tert-butyl hydroperoxide, cumyl hydroperoxide and p-methylene hydroperoxide; diazo compounds, such as azobisisobutyronitrile and azobisisobutylamidine; ammonium salts represented by ammonium persulfate; peroxide salts, such as sodium salts and potassium salts; and the like. These are used singly or as a redox system.

As an emulsifier used in the particularly preferable emulsion polymerization method, an anionic or nonionic surfactant is used as an aqueous solution or the like whose pH is optionally adjusted by acid or base, and which is formed into a buffer solution by using an inorganic salt.

The polymerization reaction is continued until the conversion rate of the monomer mixture reaches 90% or more. The obtained aqueous latex is coagulated by a salt-acid coagulation method, a method using a salt, such as calcium chloride, magnesium sulfate, sodium sulfate, or ammonium sulfate, a method using a boron compound, such as boric acid or borax, a coagulation method by heat, a freeze coagulation method, or the like. The obtained copolymer is sufficiently washed with water and dried. This acrylic rubber has Mooney viscosity $PML_{1+4}$ (100° C.) of about 5 to 100, preferably about 20 to 80.

As the component (B), which is a constituent component of the composition of the present invention, a phenothiazine-based antioxidant represented by the general formula [I] is used.

(I)

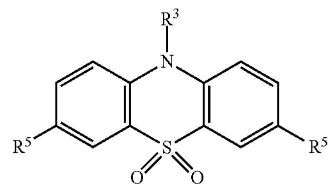

wherein $R^3$ is a hydrogen atom, a monovalent aliphatic hydrocarbon group having 1 to 20 carbon atoms, an aralkyl group having 7 to 20 carbon atoms, or an acyl group represented by the following general formula:

(II)

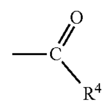

(wherein $R^4$ is a monovalent aliphatic hydrocarbon group having 1 to 20 carbon atoms), and $R^5$ is an aralkyl group having 7 to 20 carbon atoms; and Specific examples wherein $R^3$ is a aliphatic hydrocarbon group having 1 to 20 carbon atoms include a methyl group, an ethyl group, an n-propyl group, an n-butyl group, an n-pentyl group, an n-hexyl group, an n-heptyl group, an n-octyl group, an n-nonyl group, an n-undecyl group, an n-pentadecyl group, an n-heptadecyl group, an isopropyl group, a 2-butyl group, a 2-pentyl group, a 3-pentyl group, a 2-hexyl group, a 3-hexyl group, a 2-heptyl group, a 3-heptyl group, a 4-heptyl group, a 2-octyl group, a 3-octyl group, a 4-octyl group, a tertiary butyl group, a 1,1-dimethyl-1-propyl group, a 1,1-dimethyl-1-butyl group, a 1,1-dimethyl-1-pentyl group, a 1,1-dimethyl-1-hexyl group, a 3-methyl-3-pentyl group, a 3-ethyl-3-pentyl group, a 3-methyl-3-hexyl group, a cyclopropyl group, a cyclobutyl group, a cyclopentyl group, a cyclohexyl group, a cycloheptyl group, a 1-methyl-1-cyclopentyl group, a 1-methyl-1-cyclohexyl group, a 1-adamantyl group and the like.

Specific examples wherein aralkyl group having 7 to 20 carbon atoms. include a benzyl group, an α-methylbenzyl group, and a 9-fluorenylmethyl group.

$R^4$ is a monovalent aliphatic hydrocarbon group having 1 to 20 carbon atoms. Specific examples of the aliphatic hydrocarbon group having 1 to 20 carbon atoms are the same as those of $R^3$.

In particular, monovalent aliphatic hydrocarbon groups having 4 to 20 carbon atoms, in which the carbon in the α-position with respect to the carbonyl group is tertiary carbon, is preferred. Examples of preferred groups include a tertiary butyl group, a 1,1-dimethyl propyl group, a 1,1-dimethyl-1-butyl group, a 1,1-dimethyl-1-pentyl group, a 1,1-dimethyl-1-hexyl group, a 3-methyl-3-pentyl group, a 3-ethyl-3-pentyl group, a 3-methyl-3-hexyl group, a 1-methyl-1-cyclopentyl group, a 1-methyl-1-cyclohexyl group, a 1-adamantyl group, and the like.

Examples of the aralkyl group represented by $R^5$ include a benzyl group, an α-methylbenzyl group and an α,α-dimethylbenzyl group; in particular, an α,α-dimethylbenzyl group is preferred.

A phenothiazine-based antioxidant wherein $R^3$ is a hydrogen atom can be produced by the method described in Patent Document 6. For example, α-methylstyrene is allowed to act on phenothiazine in the presence of an acidic catalyst to form 3,7-bis(α,α-dimethylbenzyl)-10H-phenothiazine (hereinafter abbreviated as CD-S), and the sulfur atom is then oxidized with an oxidizing agent, whereby 3,7-bis(α,α-dimethylbenzyl)-10H-phenothiazine-5,5-dioxide (hereinafter abbreviated as $CD\text{-}SO_2$) can be produced.

In the case of a phenothiazine-based antioxidant wherein $R^3$ is an aliphatic hydrocarbon group having 1 to 20 carbon atoms, a base is allowed to act on CD-S, and the resultant is then N-alkylated with a halide of an aliphatic hydrocarbon having 1 to 20 carbon atoms, followed by oxidation of the sulfur atom, whereby the desired phenothiazine antioxidant can be produced. Moreover, a base may be allowed to act on $CD\text{-}SO_2$ obtained in Patent Document 6, and then a halide of an aliphatic hydrocarbon having 1 to 20 carbon atoms may be allowed to act thereon.

A phenothiazine-based antioxidant wherein $R^3$ is an acyl group represented by the general formula [II] can be produced by the method described in Patent Document 13. Specifically, CD-S is N-acylated with an acyl halide in the presence of a basic organic compound or a basic inorganic compound, followed by oxidization of the sulfur atom, whereby the desired phenothiazine antioxidant can be produced.

It can also be produced by N-acylation from $CD\text{-}SO_2$ in a similar manner.

Specific examples of the phenothiazine-based antioxidant represented by the general formula [I] include:

3,7-bis(α,α-dimethylbenzyl)-10H-phenothiazine-5,5-dioxide,
10-methyl-3,7-bis(α,α-dimethylbenzyl)-10H-phenothiazine-5,5-dioxide,
10-n-propyl-3,7-bis(α,α-dimethylbenzyl)-10H-phenothiazine-5,5-dioxide,
10-isopropyl-3,7-bis(α,α-dimethylbenzyl)-10H-phenothiazine-5,5-dioxide,
10-benzyl-3,7-bis(α,α-dimethylbenzyl)-10H-phenothiazine-5,5-dioxide,
10-pivaloyl-3,7-bis(α,α-dimethylbenzyl)-10H-phenothiazine-5,5-dioxide,
10-(2,2-dimethyl-butanoyl)-3,7-bis(α,α-dimethylbenzyl)-10H-phenothiazine-5,5-dioxide,
10-(1-adamantanecarbonyl)-3,7-bis(α,α-dimethylbenzyl)-10H-phenothiazine-5,5-dioxide,
and the like.

The phenothiazine-based antioxidant as the component (B) is used in an amount of about 0.01 to 5 parts by weight, preferably about 0.1 to 5 parts by weight, based on 100 parts by weight of the acrylic rubber as the component (A). If the amount of antioxidant is less than this range, thermal oxidative degradation of the crosslinked acrylic rubber leads to a more significant decrease in mechanical properties. In particular, it is difficult to suppress significant hardening degradation in the later stage of thermal oxidative degradation. In contrast, if the antioxidant is used in an amount greater than the above range, not only softening degradation in the early stage of thermal oxidative degradation may be promoted, but also a further effect of suppressing hardening degradation in the later stage of thermal oxidative degradation cannot be expected, which is not economical.

Examples of the crosslinking accelerator as the component (C) include crosslinking accelerators, such as guanidine compounds, diazabicycloalkene compounds, or organic acid salts thereof.

Examples of guanidine compound include tetramethylguanidine, tetraethylguanidine, 1,3-diphenylguanidine, 1,3-di-o-tolylguanidine, and the like. Preferably 1,3-diphenylguanidine, 1,3-di-o-tolylguanidine, or a combination thereof.

The diazabicycloalkene compound is preferably 1,8-diazabicyclo[5.4.0]-7-undecene.

The organic acid salt of diazabicycloalkene compound is preferably an organic acid salt of 1,8-diazabicyclo[5.4.0]-7-undecene.

Examples of the organic acid used in the organic acid salt of 1,8-diazabicyclo[5.4.0]-7-undecane include organic monobasic acids or organic dibasic acids.

Examples of the organic monobasic acid include n-hexanoic acid, n-heptanoic acid, n-octanoic acid, 2-ethylhexanoic acid, n-capric acid, n-lauric acid, p-toluenesulfonic acid, phenol, and the like. Examples of the organic dibasic acid include adipic acid, pimelic acid, suberic acid, azelaic acid, sebacic acid, undecanedioic acid, dodecanedioic acid, terephthalic acid, orthophthalic acid, phthalic acid, and the like. Preferable examples are monocarboxylic acids or dicarboxylic acids having 6 to 18 carbon atoms.

The crosslinking accelerator as the component (C) is used in an amount of about 0.1 to 5 parts by weight, preferably about 0.3 to 3 parts by weight, based on 100 parts by weight of the acrylic rubber as the component (A). If the amount of the crosslinking accelerator is less than this range, the crosslinking rate may be significantly reduced, the mechanical properties of the acrylic rubber after crosslinking may be reduced, and the mechanical properties after heat aging may be reduced. In contrast, if the crosslinking accelerator is used in an amount greater than the this range, the thermal oxidative degradation resistant or compression set resistance characteristics of the acrylic rubber may be worsened.

The crosslinkable acrylic rubber composition of the present invention may be compounded with, if necessary, various additives, such as fillers, processing aids, plasticizers, softeners, colorants, stabilizers, adhesion aids, mold release agents, conductivity imparting agents, thermal conductivity imparting agents, surface non-adhesives, tackifiers, flexibility imparting agents, heat resistance improving agents, flame retardants, UV absorbers, oil resistance improving agents, scorch retarders, and lubricants.

Examples of the filler include silica, such as basic silica and acidic silica; metal oxides, such as zinc oxide, calcium oxide, titanium oxide, and aluminum oxide; metal hydroxides, such as magnesium hydroxide, aluminum hydroxide, and calcium hydroxide; carbonates, such as magnesium carbonate, aluminum carbonate, calcium carbonate, and barium carbonate; silicates, such as magnesium silicate, calcium silicate, sodium silicate, and aluminum silicate; sulfates, such as aluminum sulfate, calcium sulfate, and barium sulfate; metal sulfides, such as molybdenum disulfide, iron sulfide, and copper sulfide; synthetic hydrotalcite; diatomaceous earth, asbestos, lithopone (zinc sulfide/barium sulfide), graphite, carbon black (MT carbon black, SRF carbon black, FEF carbon black, etc.), fluorinated carbon, calcium fluoride, coke, quartz fine powder, zinc white, talc, mica powder, wollastonite, carbon fiber, aramid fiber, various whiskers, glass fiber, organic reinforcing agents, organic fillers, and the like.

Examples of the processing aid include higher fatty acids, such as stearic acid, oleic acid, palmitic acid, and lauric acid; higher fatty acid salts, such as sodium stearate and zinc stearate; higher fatty acid amides, such as amide stearate and amide oleate; higher fatty acid esters, such as ethyl oleate; higher aliphatic amines, such as stearyl amine and oleyl amine; petroleum-based waxes, such as camauba wax and ceresin wax; polyglycols, such as ethylene glycol, glycerol, and diethylene glycol; aliphatic hydrocarbons, such as vaseline and paraffin; silicone-based oils, silicone-based polymer, low-molecular-weight polyethylene, phthalic acid esters, phosphoric acid esters, rosin, (halogenated) dialkyl amine, (halogenated) dialkyl sulfone, surfactants, and the like.

Examples of the plasticizer include epoxy resin, and derivatives of phthalic acid and sebacic acid and the like. Examples of the softener include lubricating oil, process oil, coal tar, castor oil, and calcium stearate and the like. Examples of the antioxidant include phenylenediamines, phosphates, quinolines, cresols, phenols, dithiocarbamate metal salts, and the like.

The above compounding agents used as needed are compounded in the crosslinkable acrylic rubber composition of the present invention comprising acrylic rubber, a phenothiazine-based antioxidant, and a crosslinking accelerator, and the resulting mixture is mixed with a Banbury mixer, a pressure kneader, an open roll, or the like. The obtained crosslinkable mixture is crosslinked by primary crosslinking at about 120 to 250° C. for about 1 to 60 minutes and optionally oven crosslinking (secondary crosslinking) at about 120 to 200° C. for about 1 to 20 hours.

EXAMPLES

The following describes the present invention with reference to Examples.

Reference Example 1

Production of 3,7-bis(α,α-dimethylbenzyl)-10H-phenothiazine-5,5-dioxide [CD-$SO_2$]

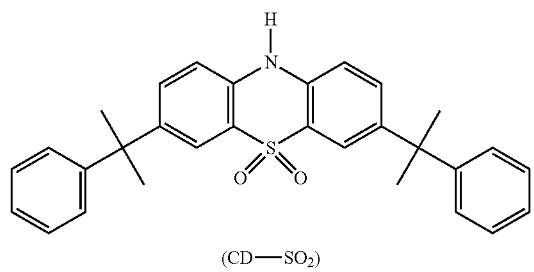

(CD—$SO_2$)

In a 500 ml four-necked flask equipped with a magnetic stirrer, a thermometer, nitrogen gas inlet and outlet, and a reflux cooling tube, 24.9 g (0.125 mol) of phenothiazine, 0.6 g of p-toluenesulfonic acid, and 115 ml of toluene were charged and the mixture was heated to 80° C. Then, 29.5 g (0.25 mol) of α-methylstyrene was added, and the mixture was reacted in a nitrogen gas atmosphere for 1 hour.

Next, 30 g of acetic acid was added to the reaction mixture, then 42.5 g of a 30% hydrogen peroxide solution was added in five batches, and the mixture was further reacted at 80° C. for 2 hours. After the content was cooled down to the room temperature and allowed to stand, the upper toluene layer was poured into 500 ml of methanol. After being left at room temperature overnight, 42.5 g (yield: 72%) of crude CD-$SO_2$ was obtained as pale-yellow crystals. This was recrystallized with ethanol to obtain 38 g (yield: 65%) of CD-$SO_2$ as pale-yellow needle-like crystals.

Reference Example 2

Production of 10-pivaloyl-3,7-bis(α,α-dimethylbenzyl)-10H-phenothiazine-5,5-dioxide [CD-$SO_2$—PIV]

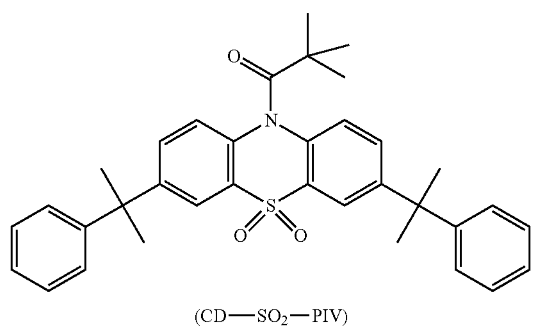

(CD—$SO_2$—PIV)

In a 1000 ml four-necked flask equipped with a magnetic stirrer, a thermometer, nitrogen gas inlet and outlet, and a reflux cooling tube, 119.6 g (0.6 mol) of phenothiazine, 2.88 g of p-toluenesulfonic acid, and 480 ml of toluene were charged and the mixture was heated to 80° C. Then, 141.9 g (1.2 mol) of α-methylstyrene was added, and the mixture was reacted in a nitrogen gas atmosphere for 1 hour.

After the reaction mixture was cooled down to the room temperature, the toluene was distilled off under reduced pressure to obtain 265.5 g of a purple solid reaction product. The reaction product was recrystallized with 1500 ml of ethanol to obtain 179 g (yield: 68%) of crude 3,7-bis(α,α-dimethylbenzyl)-10H-phenothiazine [CD-S] as pale red purple crystals. Further, the crude CD-S was recrystallized again with ethanol to obtain 161 g of purified CD-S as colorless flaky crystals.

In a 500 ml three-necked flask equipped with a magnetic stirrer, a thermometer, and a reflux cooling tube, 68.7 g (158 mmol) of crude CD-S, 24.8 g (206 mmol) of pivaloyl chloride, and 60 g of pyridine were sequentially charged and reacted at 120° C. for 1.5 hours. The pyridine was distilled off from the obtained reaction mixture under reduced pressure, and the residue was then dissolved in 300 ml of dichloromethane. The organic layer was washed three times with 300 ml of a saturated aqueous sodium chloride solution and dried over anhydrous magnesium sulfate. After filtering the magnesium sulfate, volatile components were distilled off from the filtrate under reduced pressure, thereby obtaining 81.7 g of a red highly viscous liquid.

The highly viscous liquid was dissolved in 250 ml of toluene, and the resultant was charged in a 1000 ml three-necked flask equipped with a magnetic stirrer, a thermometer, and a reflux cooling tube. Then, 80 g of acetic acid and 107 g of a 30% hydrogen peroxide solution were sequentially charged, and the mixture was reacted at 90° C. for 2 hours.

After the content was cooled down to the room temperature, the upper toluene layer was taken out, and volatile materials were distilled off under reduced pressure. 89 g of the obtained pale red solid was recrystallized with a mixed solvent of ethanol/toluene (volume ratio of 9:1), thereby obtaining 70.3 g (yield: 81%) of CD-$SO_2$—PIV as colorless needle crystals.

$^1$H NMR (300 MHz, $CDCl_3$, δ ppm): 1.22 (s, 9H, —$C(C\underline{H}_3)_3$)

1.71 (s, 12H, —$C(C\underline{H}_3)_2$—)

7.19~7.30 (m, 12H)

7.42 (d, J=9.0 Hz, 2H)

8.03 (d, J=1.8 Hz, 2H)

Reference Example 3

Production of 10-benzyl-3,7-bis(α,α-dimethylbenzyl)-10H-phenothiazine-5,5-dioxide [CD-$SO_2$—Bn]

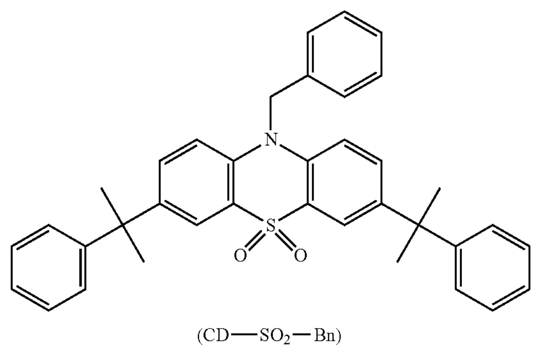

(CD—$SO_2$—Bn)

In a 1000 ml four-necked flask equipped with a magnetic stirrer, a thermometer, gas inlet tube; and a reflux cooling tube, 43.6 g (100 mmol) of the purified CD-S and 250 ml of N,N-dimethylformamide were charged and the mixture was cooled down to 5° C. or lower in a nitrogen atmosphere. While maintaining the temperature in the system at 10° C. or lower, 3.6 g (150 mmol) of sodium hydride was added, and the mixture was reacted for 1 hour. After 16.4 g (130 mmol) of benzyl chloride was added, the mixture was reacted at 70° C. for 1 hour. The obtained reaction mixture was cooled down to the room temperature and then poured into a saturated aqueous sodium chloride solution. The product was extracted with dichloromethane, and the organic layer was dried over anhydrous magnesium sulfate. After the magnesium sulfate was removed by filtration, volatile components were distilled off under reduced pressure from the filtrate, thereby obtaining 55.1 g of crude 10-benzyl-3,7-bis(α,α-dimethylbenzyl)-10H-phenothiazine [CD-S-Bn] as a slightly yellowish solid.

55.1 g of the crude CD-S-Bn was dissolved in 500 ml of toluene, and the resultant was charged in a 1000 ml four-necked flask equipped with a magnetic stirrer, a thermometer, and a reflux cooling tube. Then, 60 g of acetic acid and 68 g of a 60% hydrogen peroxide solution were sequentially charged, and the mixture was reacted at 90° C. for 2 hours.

After the content was cooled down to the room temperature, the upper toluene layer was taken out, and volatile materials were distilled off under reduced pressure. The obtained red product was recrystallized with toluene, thereby obtaining 48.1 g (yield from CD-S: 86%) of CD-$SO_2$—Bn as colorless crystals.

$^1$H NMR (400 MHz, Acetone $d_6$, δ ppm):

1.74 (s, 12H, —$C(C\underline{H}_3)_2$—)

5.56 (s, 2H, N—$C\underline{H}_2$—Ar)

7.15~7.37 (m, 17H, Ar)

7.42 (dd, J=8.8 Hz, 2.8 Hz, 2H, Ar)

7.92 (d, J=2.8 Hz, 2H, Ar)

Reference Example 4

Production of 10-propyl-3,7-bis(α,α-dimethylbenzyl)-10H-phenothiazine-5,5-dioxide [CD-$SO_2$—Pr]

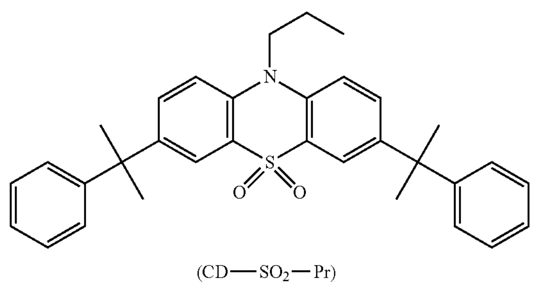

(CD—$SO_2$—Pr)

In a 500 ml four-necked flask equipped with a magnetic stirrer, a thermometer, gas inlet tube and a reflux cooling tube, 21.8 g (50 mmol) of the purified CD-S and 160 ml of N,N-dimethylformamide were charged and the mixture was cooled down to 5° C. or lower in a nitrogen atmosphere. While maintaining the temperature in the system at 10° C. or lower, 1.8 g (75 mmol) of sodium hydride was added, and the mixture was reacted for 1 hour. Then, after 8.0 g (65 mmol) of propyl bromide was added, the mixture was reacted at 70° C. for 1 hour. The obtained reaction mixture was cooled down to the room temperature and then poured into a saturated aqueous sodium chloride solution. The product was extracted with ethyl acetate, and the organic layer was dried over anhydrous magnesium sulfate. After the insoluble matters was removed by filtration, volatile components were distilled off under reduced pressure from the filtrate, thereby obtaining 24.9 g of crude 10-propyl-3,7-bis(α,α-dimethylbenzyl)-10H-phenothiazine [CD-S—Pr] as a slightly yellowish solid.

24.9 g of the crude CD-S—Pr was dissolved in 250 ml of toluene, and the resultant was charged in a 500 ml four-necked flask equipped with a magnetic stirrer, a thermometer and a reflux cooling tube. Then, 40 g of acetic acid and 34 g of a 60% hydrogen peroxide solution were sequentially charged, and the mixture was reacted at 90° C. for 2 hours.

After the content was cooled down to the room temperature, the upper toluene layer was taken out, and volatile materials were distilled off under reduced pressure. The obtained product was recrystallized with a mixed solvent of toluene/ethanol (volume ratio of 5:1), thereby obtaining 21.7 g (yield from CD-S: 85%) of CD-$SO_2$—Pr as colorless crystals.

$^1$H NMR (400 MHz, Chloroform-d), δ ppm (TMS):

1.01 (t, J=7.2 Hz, 3H, —$CH_2CH_2C\underline{H}_3$)

1.73 (s, 12H, —$C(C\underline{H}_3)_2$—)

1.89 (sext, J=7.6 Hz, 2H, —$CH_2C\underline{H}_2CH_3$)

4.03 (t, J=8.0 Hz, 2H, —$C\underline{H}_2CH_2CH_3$)

7.14~7.32 (m, 14H, Ar)

8.13 (d, J=2.4 Hz, 2H, Ar)

Reference Example 5

Production of 9FMM

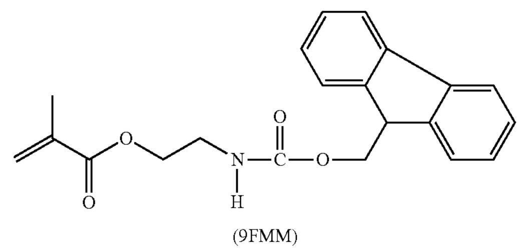 [SMILES: C=C(C)C(=O)OCCNC(=O)OCC1c2ccccc2-c2ccccc21]

(9FMM)

In a 1000 ml four-necked flask equipped with a magnetic stirrer, a thermometer, a nitrogen gas inlet and outlet, and a reflux cooling tube, 16.4 g (135 mmol) of 9-fluorenylmethanol, 25.1 g (162 mmol) of 2-isocyanatoethyl methacrylate, 1.1 g of dibutyltin dilaurate, and 440 ml of benzene were charged and reacted in a nitrogen atmosphere at 80° C. for 2 hours.

After the reaction mixture was cooled to room temperature, 60 mg of para-methoxyphenol was added, and the benzene was then removed under the reduced pressure to obtain 67.2 g of a crude reaction product. The reaction product was recrystallized in 600 ml of ethanol, thereby obtaining 41.1 g (yield: 87%) of 9FMM as colorless crystals.

$^1$H-NMR (400 MHz, Acetone d6, δ ppm):

1.91 (s, 3H, $CH_2$═$C(C\underline{H}_3)$—C(═O)—O—)

3.47 (q, J=5.6 Hz, 2H, —O—$CH_2C\underline{H}_2$—NH—C(C═O)—)

4.21 (t, J=5.6 Hz, 2H, —O—$C\underline{H}_2CH_2$—NH—C(C═O)—)

4.23 (t, J=7.2 Hz, 1H, —C(═O)—$OCH_2$—C$\underline{H}$—$Ar_2$)

4.35 (d, J=7.2 Hz, 2H, —C(═O)—$OC\underline{H}_2$—CH—$Ar_2$)

5.62 (s, 1H, against the carbonyl group trans-$C\underline{H}_2$═$C(CH_3)$—C(═O)—O—)

6.10 (s, 1H, against the carbonyl group cis-$C\underline{H}_2$═$C(CH_3)$—C(═O)—O—)

6.73 (brs, 1H, —O—$CH_2CH_2$—N$\underline{H}$—C(C═O)—

7.32 (t, J=7.6 Hz, 2H, Ar)

7.41 (t, J=7.6 Hz, 2H, Ar)

7.68 (d, J=7.6 Hz, 2H, Ar)

7.86 (d, J=7.6 Hz, 2H, Ar)

Reference Example 6

[Production of Acrylic Rubber (a)]

In a separable flask equipped with a thermometer, a stirrer, a nitrogen gas inlet tube, and a Dimroth condenser tube, the following components were charged.

| | |
|---|---|
| Water | 187 parts by weight |
| Sodium lauryl sulfate | 2 parts by weight |
| Polyoxyethylene lauryl ether | 2 parts by weight |
| Charged monomer mixture | |
| Ethyl acrylate [EA] | 97.8 parts by weight |
| Mono n-butyl fumarate [MBF] | 0.8 parts by weight |
| 9FMM | 1.4 parts by weight |

After oxygen was sufficiently removed from the system by replacement with nitrogen gas, the following components were added.

| | |
|---|---|
| Sodium formaldehyde sulfoxylate (Rongalite, produced by FUJIFILM Wako Pure Chemical Corporation) | 0.008 parts by weight |
| Tertiary butyl hydroperoxide (Perbutyl H69, produced by NOF Corporation) | 0.0047 parts by weight |

Then, a polymerization reaction was initiated at room temperature, and the reaction was continued until the polymerization conversion rate reached 90% or more. The obtained aqueous latex was coagulated with a 10 wt. % sodium sulfate aqueous solution, followed by water washing and drying, thereby obtaining an acrylic rubber (a).

The Mooney viscosity $PML_{1+4}$ (100° C.) of the obtained acrylic rubber (a) was 46. The molar fraction compositions of 9FMM and EA+MBF were 0.40 mol % and 99.60 mol %, respectively, determined by $^1$H-NMR (400 MHz, $CD_3C(=O)CD_3$, δ ppm) using the following formulas.

α: integral value of signal at 6.4-8.1 ppm

β: integral value of signal at 3.2-5.0 ppm $$9FMM(\text{mol }\%) = 200\times\alpha/(9\beta-5\alpha)$$

$$EA+MBF(\text{mol }\%) = 100-9FMM(\text{mol }\%)$$

Moreover, the approximate weight fraction compositions of 9FMM and EA+MBF were 1.4 wt % and 98.6 wt %, respectively, determined by the following formulas.

$$9FMM(\text{wt }\%) = 9FMM(\text{mol }\%)\times 351.4\times 100/$$

$$[9FMM(\text{mol }\%)\times 351.4+(EA+MBF(\text{mol }\%))\times 100.5)]$$

$$EA+MBF(\text{wt }\%) = 100-9FMM(\text{wt }\%)$$

Further, MBF (wt %) was 0.6 wt %, determined by measuring the acid value of the acrylic rubber (a).

Reference Example 7

[Production of Acrylic Rubber (b)]

—Production of Acrylic Rubber (b-1)—

In the production of the acrylic rubber (a) in Reference Example 6,

| | |
|---|---|
| Ethyl acrylate [EA] | 97.2 parts by weight |
| 9FMM | 2.8 parts by weight |

were used as the charged monomer mixture, and

| | |
|---|---|
| Sodium formaldehyde sulfoxylate (Rongalite) | 0.008 parts by weight |
| Tertiary butyl hydroperoxide (Perbutyl H69) | 0.0047 parts by weight |
| Acetic acid | 0.67 parts by weight |

were used as the polymerization reaction initiator, thereby obtaining a water-based latex (b-1) (rubber solid matters: 32 wt %) and acrylic rubber b-1. The Mooney viscosity $PML_{1+4}$ (100° C.) of the obtained acrylic rubber (b-1) was 47.

When the mole fraction composition of the acrylic rubber (b-1) was determined in the same manner as for the acrylic rubber (a), the results were as follows: 9FMM: 0.80 mol % and EA: 99.20 mol %. The weight fraction compositions of 9FMM and EA were 2.7 wt % and 97.3 wt %, respectively, determined by the following formulas.

$$9FMM(\text{wt }\%) = (9FMM(\text{mol }\%)\times 351.4\times 100)/$$

$$[9FMM(\text{mol }\%)\times 351.4+(EA(\text{mol }\%))\times 100.1)]$$

$$EA(\text{wt }\%) = 100-9FMM(\text{wt }\%)$$

—Production of Acrylic Rubber (b-2)—

In the production of the acrylic rubber (a) in Reference Example 6,

| | |
|---|---|
| Ethyl acrylate [EA] | 98.4 parts by weight |
| Mono n-butyl fumarate [MBF] | 1.6 parts by weight |

were used as the charged monomer mixture, and the procedure was performed in the same manner as in the production of the acrylic rubber (a), thereby obtaining a water-based latex (b-2) (rubber solid matters: 32 wt %) and acrylic rubber (b-2). The Mooney viscosity $PML_{1+4}$ (100° C.) of the obtained acrylic rubber (b-2) was 36. Further, when the MBF content (wt %) was determined by measuring the acid value of the acrylic rubber (b-2), the result was 1.2 wt %.

Next, the same amounts of the water-based latex (b-1) and the water-based latex (b-2) were mixed, and the resulting mixture was coagulated with a 10 wt % sodium sulfate aqueous solution, followed by water washing and drying, thereby obtaining acrylic rubber (b) comprising 50 wt % of the acrylic rubber (b-1) and 50 wt % of the acrylic rubber (b-2). The Mooney viscosity $PML_1$+4 (100° C.) of the obtained acrylic rubber mixture was 39.

Reference Example 8

[Production of Acrylic Rubber (c)]

In the production of the acrylic rubber (a) in Reference Example 6,

| | |
|---|---|
| Ethyl acrylate [EA] | 57.8 parts by weight |
| n-butyl acrylate [BA] | 40.0 parts by weight |
| Mono n-butyl fumarate [MBF] | 0.8 parts by weight |
| 9FMM | 1.4 parts by weight |

were used as the charged monomer mixture, thereby obtaining an acrylic rubber (c). The Mooney viscosity $PML_{1+4}$ (100° C.) of the obtained acrylic rubber (c) was 33. Further, MBF (wt %) was 0.6 wt %, determined by measuring the acid value of the acrylic rubber (c).

Moreover, the molar fraction compositions of 9FMM and EA+BA+MBF were 0.43 mol % and 99.57 mol %, respectively, determined by $^1$H-NMR (400 MHz, $CD_3C(=O)CD_3$, δ ppm) using the following formulas.

α: integral value of signal at 6.4-8.1 ppm

β: integral value of signal at 3.2-5.0 ppm $$9FMM(\text{mol }\%) = 200\times\alpha/(9\beta-5\alpha)$$

$$EA+BA+MBF(\text{mol }\%) = 100-9FMM(\text{mol }\%)$$

Moreover, the approximate weight fraction compositions of 9FMM and EA+BA+MBF were 1.4 wt % and 98.6 wt %, respectively, determined by the following formulas.

$$9FMM(\text{wt }\%)=(9FMM(\text{mol }\%)\times 351.4\times 100)/[9FMM(\text{mol }\%)\times 351.4+(EA+BA+MBF(\text{mol }\%))\times 110.3)]$$

$$EA+BA+MBF(\text{wt }\%)=100-9FMM(\text{wt }\%)$$

Reference Example 9

[Production of Acrylic Rubber (d)]

In the production of the acrylic rubber (a) in Reference Example 6,

| | |
|---|---|
| Ethyl acrylate [EA] | 58.4 parts by weight |
| n-butyl acrylate [BA] | 40.0 parts by weight |
| Mono n-butyl fumarate [MBF] | 1.6 parts by weight |

were used as the charged monomer mixture, thereby obtaining an acrylic rubber (d). The Mooney viscosity $PML_1+4$ (100° C.) of the obtained acrylic rubber (d) was 24. Further, MBF (wt %) was 1.2 wt %, determined by measuring the acid value of the acrylic rubber (d).

Reference Example 10

[Production of Acrylic Rubber (e)]

In the production of the acrylic rubber (a) in Reference Example 6,

| | |
|---|---|
| Ethyl acrylate [EA] | 52.8 parts by weight |
| n-butyl acrylate [BA] | 40.0 parts by weight |
| Methyl methacrylate [MMA] | 5.0 parts by weight |
| Mono n-butyl fumarate [MBF] | 0.8 parts by weight |
| 9FMM | 1.4 parts by weight |

were used as the charged monomer mixture, thereby obtaining an acrylic rubber (e). The Mooney viscosity $PML_{1+4}$ (100° C.) of the obtained acrylic rubber (e) was 40. Further, MBF (wt %) was 0.6 wt %, determined by measuring the acid value of the acrylic rubber (e).

The molar fraction compositions of 9FMM and EA+BA+MMA+MBF were 0.44 mol % and 99.56 mol %, respectively, determined by $^1$H-NMR (400 MHz, $CD_3C(=O)CD_3$, δ ppm) using the following formulas.

α: integral value of signal at 6.4-8.1 ppm

β: value reduced γ from integral value of signal at 3.2-5.0 ppm

γ: integral value of signal at 3.4-3.6 ppm $$9FMM(\text{mol }\%)=600\times\alpha/(27\beta-13\alpha+18\gamma)$$

$$EA+BA+MMA+MBF(\text{mol }\%)=100-9FMM(\text{mol }\%)$$

Moreover, the approximate weight fraction compositions of 9FMM and EA+BA+MMA+MBF were 1.4 wt % and 98.6 wt %, respectively, determined by the following formulas.

$$9FMM(\text{wt }\%)=(9FMM(\text{mol }\%)\times 351.4\times 100)/[9FMM(\text{mol }\%)\times 351.4+(EA+BA+MMA+MBF(\text{mol }\%))\times 110.3)]$$

$$EA+BA+MMA+MBF(\text{wt }\%)=100-9FMM(\text{wt }\%)$$

Reference Example 11

[Production of Acrylic Rubber (f)]

In the production of the acrylic rubber (a) in Reference Example 6,

| | |
|---|---|
| Ethyl acrylate [EA] | 53.4 parts by weight |
| n-butyl acrylate [BA] | 40.0 parts by weight |
| Methyl methacrylate [MMA] | 5.0 parts by weight |
| Mono n-butyl fumarate [MBF] | 1.6 parts by weight |

were used as the charged monomer mixture, thereby obtaining an acrylic rubber (f). The Mooney viscosity $PML_{1+4}$ (100° C.) of the obtained acrylic rubber (f) was 31. Further, MBF (wt %) was 1.2 wt %, determined by measuring the acid value of the acrylic rubber (f).

Example 1

| | |
|---|---|
| Acrylic rubber (a) | 100 parts by weight |
| FEF carbon black (Seast GSO, produced by Tokai Carbon Co., Ltd.) | 60 parts by weight |
| Stearic acid (TST, produced by Miyoshi Oil & Fat Co., Ltd.) | 1 part by weight |
| Polyoxyethylene stearyl ether phosphate (Phosphanol RL-210, produced by Toho Chemical Industry Co., Ltd.) | 0.5 parts by weight |
| Crosslinking accelerator (Vulcofac ACT55, produced by Safic-Alcan) | 1 part by weight |
| $CD\text{-}SO_2$ | 2 parts by weight |

Among the above components, the acrylic rubber (a), FEF carbon black, stearic acid, and polyoxyethylene stearyl ether phosphate were mixed with a Banbury mixer. The obtained mixture and the other components were mixed using an open roll, thereby obtaining a crosslinkable acrylic rubber composition.

The obtained composition was subjected to primary crosslinking at 180° C. for 8 minutes using a 100-ton press molding machine. Further, oven crosslinking was carried out at 175° C. for 4 hours to obtain a sheet-like crosslinked product (post cured sheet) having a thickness of about 2 mm.

The crosslinking characteristics of the acrylic elastomer composition and the physical properties of its crosslinked product were measured in the following manner. Mooney scorch test: according to JIS K6300-1 corresponding to ISO 289-1 (125° C.). Using a Mooney viscometer (AM-3, produced by Toyo Seiki Seisaku-sho, Ltd.), the minimum Mooney viscosity (ML min) and scorch time (t5) values were measured.

Crosslinking test: according to JIS K6300-2 corresponding to ISO 6502 (180° C., 12 minutes). Using a rotorless rheometer (RLR-3, produced by Toyo Seiki Seisaku-sho, Ltd.), ML, MH, tc (10), and tc (90) values were measured.

ML: minimum torque

MH: maximum torque tc (10): time required for the crosslinking torque to reach ML+(MH−ML)×0.1 tc (90): time required for the crosslinking torque to reach ML+(MH−ML)×0.9

Normal state physical properties: measured according to JIS K6251 corresponding to ISO 37 and JIS K6253 corresponding to ISO 7619-1 for each of the post cured sheet Air heating aging test: measured according to JIS K6257 corresponding to ISO 188 for the post cured sheet (190° C.: 100 hours, 200 hours, 300 hours, 400 hours, 500 hours)

(175° C.: 250 hours, 500 hours, 750 hours, 1000 hours)

Example 2

In Example 1, 2 parts by weight of CD-$SO_2$—PIV was used in place of CD-$SO_2$.

Example 3

In Example 1, 2 parts by weight of CD-$SO_2$—Bn was used in place of CD-$SO_2$.

Example 4

In Example 1, 2 parts by weight of CD-$SO_2$—Pr was used in place of CD-$SO_2$.

Comparative Example 1

In Example 1, 2 parts by weight of 4,4'-bis(α,α-dimethylbenzyl)diphenylamine (Nocrac CD, produced by Ouchi Shinko Chemical Industrial Co., Ltd.) was used in place of CD-$SO_2$.

Example 5

In Example 1, the acrylic rubber (b) was used in place of the acrylic rubber (a).

Example 6

In Example 2, the acrylic rubber (b) was used in place of the acrylic rubber (a).

Example 7

In Example 3, the acrylic rubber (b) was used in place of the acrylic rubber (a).

Example 8

In Example 4, the acrylic rubber (b) was used in place of the acrylic rubber (a).

Comparative Example 2

In Comparative Example 1, the acrylic rubber (b) was used in place of the acrylic rubber (a).

Comparative Example 3

In Example 1, the acrylic rubber (b-2) was used in place of the acrylic rubber (a), and 0.6 parts by weight of hexamethylenediamine carbamate (Cheminox AC6F, produced by Unimatec Co., Ltd.) was further added.

Comparative Example 4

In Example 2, the acrylic rubber (b-2) was used in place of the acrylic rubber (a), and 0.6 parts by weight of hexamethylenediamine carbamate (Cheminox AC6F) was further added.

Comparative Example 5

In Example 3, the acrylic rubber (b-2) was used in place of the acrylic rubber (a), and 0.6 parts by weight of hexamethylenediamine carbamate (Cheminox AC6F) was further added.

Comparative Example 6

In Example 4, the acrylic rubber (b-2) was used in place of the acrylic rubber (a), and 0.6 parts by weight of hexamethylenediamine carbamate (Cheminox AC6F) was further added.

Comparative Example 7

In Comparative Example 1, the acrylic rubber (b-2) was used in place of the acrylic rubber (a), and 0.6 parts by weight of hexamethylenediamine carbamate (Cheminox AC6F) was further added.

Example 9

In Example 1, the acrylic rubber (c) was used in place of the acrylic rubber (a).

Example 10

In Example 2, the acrylic rubber (c) was used in place of the acrylic rubber (a).

Example 11

In Example 3, the acrylic rubber (c) was used in place of the acrylic rubber (a).

Comparative Example 8

In Comparative Example 1, the acrylic rubber (c) was used in place of the acrylic rubber (a).

Comparative Example 9

In Comparative Example 3, the acrylic rubber (d) was used in place of the acrylic rubber (b-2).

Comparative Example 10

In Comparative Example 4, the acrylic rubber (d) was used in place of the acrylic rubber (b-2).

Comparative Example 11

In Comparative Example 5, the acrylic rubber (d) was used in place of the acrylic rubber (b-2).

Comparative Example 12

In Comparative Example 7, the acrylic rubber (d) was used in place of the acrylic rubber (b-2).

Example 12

In Example 2, the acrylic rubber (e) was used in place of the acrylic rubber (a).

Comparative Example 13

In Comparative Example 1, the acrylic rubber (e) was used in place of the acrylic rubber (a).

Comparative Example 14

In Comparative Example 4, the acrylic rubber (f) was used in place of the acrylic rubber (b-2).

Comparative Example 15

In Comparative Example 7, the acrylic rubber (f) was used in place of the acrylic rubber (b-2).

Following Tables 1 to 6 and FIGS. 1 to 15 shows the results obtained in the above Examples 1 to 12 and Comparative Examples 1 to 15.

TABLE 1

| Measurement item | | Ex. 1 | Ex. 2 | Ex. 3 | Ex. 4 | Comp. Ex. 1 |
|---|---|---|---|---|---|---|
| Mooney scorch test (125° C.) | | | | | | |
| ML min | (pts) | 72 | 76 | 78 | 76 | 72 |
| t5 | (min) | 3.8 | 3.3 | 3.3 | 3.4 | 3.1 |
| Crosslinking test (180° C.) | | | | | | |
| tc (10) | (min) | 0.60 | 0.54 | 0.56 | 0.56 | 0.53 |
| tc (90) | (min) | 6.41 | 5.85 | 5.97 | 5.93 | 5.91 |
| ML | (N · m) | 0.26 | 0.26 | 0.26 | 0.26 | 0.25 |
| MH | (N · m) | 0.89 | 0.90 | 0.91 | 0.89 | 0.91 |
| Normal state physical properties (post cured) | | | | | | |
| Hardness | (Duro A) | 63 | 65 | 64 | 68 | 64 |
| 100% modulus | (MPa) | 6.7 | 6.7 | 6.9 | 7.1 | 6.6 |
| Strength at break | (MPa) | 16.8 | 17.5 | 17.8 | 18.2 | 17.1 |
| Elongation at break | (%) | 210 | 210 | 210 | 220 | 220 |
| Air heating aging test (190° C., 100 hours) | | | | | | |
| Hardness | (Duro A) | 73 | 73 | 73 | 74 | 73 |
| 100% modulus | (MPa) | 6.1 | 6.3 | 6.7 | 6.6 | 5.5 |
| Strength at break | (MPa) | 12.9 | 13.3 | 14.0 | 14.0 | 12.5 |
| Elongation at break | (%) | 210 | 200 | 200 | 210 | 230 |
| Air heating aging test (190° C., 200 hours) | | | | | | |
| Hardness | (Duro A) | 76 | 76 | 77 | 76 | 77 |
| 100% modulus | (MPa) | 4.7 | 4.7 | 5.1 | 5.3 | 4.6 |
| Strength at break | (MPa) | 9.5 | 9.9 | 10.2 | 10.4 | 9.0 |
| Elongation at break | (%) | 230 | 230 | 220 | 220 | 230 |
| Air heating aging test (190° C., 300 hours) | | | | | | |
| Hardness | (Duro A) | 81 | 82 | 83 | 81 | 83 |
| 100% modulus | (MPa) | 3.8 | 3.9 | 4.0 | 4.5 | 4.7 |
| Strength at break | (MPa) | 6.7 | 7.0 | 7.0 | 7.6 | 7.0 |
| Elongation at break | (%) | 240 | 250 | 240 | 230 | 200 |
| Air heating aging test (190° C., 400 hours) | | | | | | |
| Hardness change | (Duro A) | 89 | 88 | 89 | 89 | 90 |
| 100% modulus | (MPa) | 4.2 | 4.6 | 4.7 | 5.0 | |
| Strength at break | (MPa) | 4.7 | 5.3 | 5.2 | 5.7 | 6.8 |
| Elongation at break | (%) | 180 | 190 | 170 | 160 | 70 |
| Air heating aging test (190° C., 500 hours) | | | | | | |
| Hardness change | (Duro A) | 93 | 94 | 95 | 96 | 95 |
| 100% modulus | (MPa) | | | | | |
| Strength at break | (MPa) | 6.6 | 6.5 | 6.6 | 7.2 | 12.2 |
| Elongation at break | (%) | 70 | 60 | 60 | 60 | 20 |
| Air heating aging test (175° C., 500 hours) | | | | | | |
| Hardness change | (Duro A) | 76 | 76 | 76 | 75 | 73 |
| 100% modulus | (MPa) | 4.8 | 4.9 | 5.4 | 5.6 | 4.8 |
| Strength at break | (MPa) | 9.9 | 10.3 | 10.5 | 10.7 | 9.6 |
| Elongation at break | (%) | 230 | 230 | 220 | 220 | 240 |
| Air heating aging test (175° C., 1000 hours) | | | | | | |
| Hardness change | (Duro A) | 89 | 90 | 90 | 91 | 91 |
| 100% modulus | (MPa) | 5.5 | 5.3 | 5.4 | 5.8 | 6.2 |
| Strength at break | (MPa) | 6.7 | 6.7 | 6.8 | 7.3 | 7.2 |
| Elongation at break | (%) | 180 | 220 | 200 | 200 | 170 |

TABLE 2

| Measurement item | | Ex. 5 | Ex. 6 | Ex. 7 | Ex. 8 | Comp. Ex. 2 |
|---|---|---|---|---|---|---|
| Mooney scorch test (125° C.) | | | | | | |
| ML min | (pts) | 68 | 69 | 69 | 68 | 67 |
| t5 | (min) | 3.0 | 3.0 | 3.2 | 3.4 | 2.5 |
| Crosslinking test (180° C.) | | | | | | |
| tc (10) | (min) | 0.62 | 0.55 | 0.58 | 0.57 | 0.57 |
| tc (90) | (min) | 6.35 | 5.87 | 5.95 | 5.94 | 5.91 |
| ML | (N · m) | 0.26 | 0.26 | 0.27 | 0.27 | 0.25 |
| MH | (N · m) | 0.82 | 0.80 | 0.84 | 0.84 | 0.82 |
| Normal state physical properties (post cured) | | | | | | |
| Hardness | (Duro A) | 66 | 66 | 67 | 70 | 66 |
| 100% modulus | (MPa) | 7.0 | 8.1 | 7.5 | 7.9 | 6.9 |
| Strength at break | (MPa) | 15.0 | 16.3 | 16.2 | 17.0 | 16.0 |
| Elongation at break | (%) | 200 | 200 | 200 | 210 | 230 |
| Air heating aging test (190° C., 100 hours) | | | | | | |
| Hardness | (Duro A) | 74 | 76 | 75 | 72 | 72 |
| 100% modulus | (MPa) | 6.2 | 6.6 | 6.5 | 6.6 | 5.4 |
| Strength at break | (MPa) | 11.9 | 12.1 | 11.8 | 12.4 | 10.8 |
| Elongation at break | (%) | 210 | 210 | 200 | 210 | 220 |
| Air heating aging test (190° C., 200 hours) | | | | | | |
| Hardness | (Duro A) | 75 | 76 | 78 | 77 | 76 |
| 100% modulus | (MPa) | 4.4 | 4.7 | 5.0 | 5.3 | 4.3 |
| Strength at break | (MPa) | 7.9 | 8.5 | 8.7 | 8.7 | 7.0 |
| Elongation at break | (%) | 220 | 220 | 210 | 210 | 220 |
| Air heating aging test (190° C., 300 hours) | | | | | | |
| Hardness | (Duro A) | 82 | 84 | 82 | 82 | 83 |
| 100% modulus | (MPa) | 3.7 | 3.8 | 4.0 | 4.6 | 4.4 |
| Strength at break | (MPa) | 5.6 | 5.9 | 6.1 | 6.5 | 5.8 |
| Elongation at break | (%) | 230 | 240 | 230 | 210 | 200 |
| Air heating aging test (190° C., 400 hours) | | | | | | |
| Hardness | (Duro A) | 87 | 88 | 89 | 91 | 92 |
| 100% modulus | (MPa) | 4.1 | 4.1 | 4.2 | 4.8 | |
| Strength at break | (MPa) | 4.3 | 4.3 | 4.4 | 5.1 | 6.7 |
| Elongation at break | (%) | 190 | 180 | 170 | 130 | 50 |
| Air heating aging test (190° C., 500 hours) | | | | | | |
| Hardness | (Duro A) | 93 | 93 | 93 | 96 | 95 |
| 100% modulus | (MPa) | | | | | |
| Strength at break | (MPa) | 6.3 | 6.1 | 6.5 | 7.4 | 12.0 |
| Elongation at break | (%) | 70 | 70 | 70 | 60 | 10 |
| Air heating aging test (175° C., 500 hours) | | | | | | |
| Hardness change | (Duro A) | 78 | 76 | 76 | 78 | 76 |
| 100% modulus | (MPa) | 4.6 | 4.7 | 5.0 | 5.3 | 4.1 |
| Strength at break | (MPa) | 8.5 | 8.7 | 9.0 | 9.4 | 7.5 |
| Elongation at break | (%) | 220 | 220 | 220 | 220 | 240 |
| Air heating aging test (175° C., 1000 hours) | | | | | | |
| Hardness change | (Duro A) | 89 | 89 | 89 | 90 | 91 |
| 100% modulus | (MPa) | 4.9 | 4.7 | 5.2 | 5.6 | 6.0 |
| Strength at break | (MPa) | 5.6 | 5.7 | 5.9 | 6.2 | 6.3 |
| Elongation at break | (%) | 190 | 210 | 180 | 190 | 160 |

TABLE 3

| Measurement item | | Comp. Ex. 3 | Comp. Ex. 4 | Comp. Ex. 5 | Comp. Ex. 6 | Comp. Ex. 7 |
|---|---|---|---|---|---|---|
| Mooney scorch test (125° C.) | | | | | | |
| ML min | (pts) | 63 | 67 | 67 | 66 | 65 |
| t5 | (min) | 3.1 | 3.3 | 3.2 | 3.2 | 2.8 |
| Crosslinking test (180° C.) | | | | | | |
| tc (10) | (min) | 0.53 | 0.51 | 0.51 | 0.51 | 0.51 |
| tc (90) | (min) | 5.45 | 5.15 | 5.30 | 5.22 | 4.84 |
| ML | (N · m) | 0.28 | 0.27 | 0.28 | 0.29 | 0.26 |
| MH | (N · m) | 1.02 | 1.00 | 1.01 | 1.03 | 1.01 |

TABLE 3-continued

| Measurement item | | Comp. Ex. 3 | Comp. Ex. 4 | Comp. Ex. 5 | Comp. Ex. 6 | Comp. Ex. 7 |
|---|---|---|---|---|---|---|
| Normal state physical properties (post cured) | | | | | | |
| Hardness | (Duro A) | 67 | 67 | 66 | 70 | 65 |
| 100% modulus | (MPa) | 4.9 | 4.8 | 5.9 | 6.0 | 5.5 |
| Strength at break | (MPa) | 15.7 | 16.6 | 16.8 | 16.8 | 16.6 |
| Elongation at break | (%) | 220 | 230 | 230 | 240 | 250 |
| Air heating aging test (190° C., 100 hours) | | | | | | |
| Hardness change | (Duro A) | 74 | 73 | 74 | 72 | 69 |
| 100% modulus | (MPa) | 3.4 | 3.7 | 4.1 | 3.7 | 2.9 |
| Strength at break | (MPa) | 10.2 | 10.8 | 11.1 | 11.2 | 9.2 |
| Elongation at break | (%) | 320 | 300 | 290 | 310 | 360 |
| Air heating aging test (190° C., 200 hours) | | | | | | |
| Hardness | (Duro A) | 79 | 77 | 78 | 76 | 73 |
| 100% modulus | (MPa) | 2.8 | 2.9 | 3.2 | 3.5 | 2.7 |
| Strength at break | (MPa) | 6.4 | 7.1 | 7.0 | 7.4 | 5.4 |
| Elongation at break | (%) | 350 | 340 | 320 | 310 | 350 |
| Air heating aging test (190° C., 300 hours) | | | | | | |
| Hardness | (Duro A) | 84 | 83 | 84 | 85 | 80 |
| 100% modulus | (MPa) | 2.6 | 2.7 | 2.9 | 3.4 | 3.5 |
| Strength at break | (MPa) | 3.8 | 4.3 | 4.4 | 5.0 | 4.5 |
| Elongation at break | (%) | 380 | 380 | 330 | 320 | 250 |
| Air heating aging test (190° C., 400 hours) | | | | | | |
| Hardness | (Duro A) | 89 | 89 | 88 | 91 | 93 |
| 100% modulus change | (MPa) | 3.4 | 3.5 | 3.7 | 4.4 | |
| Strength at break | (MPa) | 3.2 | 3.5 | 3.9 | 4.5 | 6.5 |
| Elongation at break | (%) | 210 | 180 | 170 | 130 | 50 |
| Air heating aging test (190° C., 500 hours) | | | | | | |
| Hardness | (Duro A) | 93 | 93 | 95 | 96 | 97 |
| 100% modulus | (MPa) | | | | | |
| Strength at break | (MPa) | 6.4 | 6.0 | 6.7 | 8.2 | 12.6 |
| Elongation at break | (%) | 60 | 80 | 50 | 40 | 20 |
| Air heating aging test (175° C., 500 hours) | | | | | | |
| Hardness change | (Duro A) | 80 | 79 | 77 | 80 | 75 |
| 100% modulus | (MPa) | 2.9 | 3.0 | 3.4 | 3.4 | 2.7 |
| Strength at break | (MPa) | 6.9 | 7.4 | 7.8 | 7.7 | 5.9 |
| Elongation at break | (%) | 370 | 350 | 320 | 320 | 380 |
| Air heating aging test (175° C., 1000 hours) | | | | | | |
| Hardness change | (Duro A) | 89 | 90 | 92 | 88 | 89 |
| 100% modulus | (MPa) | 4.1 | 4.4 | 4.5 | 5.0 | 5.7 |
| Strength at break | (MPa) | 4.2 | 4.8 | 4.7 | 5.1 | 5.8 |
| Elongation at break | (%) | 200 | 290 | 240 | 230 | 160 |

TABLE 4

| Measurement item | | Ex. 9 | Ex. 10 | Ex. 11 | Comp. Ex. 8 |
|---|---|---|---|---|---|
| Mooney scorch test (125° C.) | | | | | |
| ML min | (pts) | 58 | 61 | 60 | 57 |
| t5 | (min) | 3.6 | 3.0 | 3.1 | 3.3 |
| Crosslinking test (180° C.) | | | | | |
| tc (10) | (min) | 0.62 | 0.56 | 0.56 | 0.58 |
| tc (90) | (min) | 6.56 | 6.09 | 6.14 | 6.18 |
| ML | (N · m) | 0.21 | 0.22 | 0.21 | 0.21 |
| MH | (N · m) | 0.79 | 0.82 | 0.80 | 0.78 |
| Normal state physical properties (post cured) | | | | | |
| Hardness | (Duro A) | 63 | 62 | 62 | 62 |
| 100% modulus | (MPa) | 7.3 | 7.6 | 7.2 | 7.4 |
| Strength at break | (MPa) | 13.8 | 14.1 | 14.3 | 13.0 |
| Elongation at break | (%) | 160 | 160 | 170 | 160 |

TABLE 4-continued

| Measurement item | | Ex. 9 | Ex. 10 | Ex. 11 | Comp. Ex. 8 |
|---|---|---|---|---|---|
| Air heating aging test (190° C., 100 hours) | | | | | |
| Hardness | (Duro A) | 69 | 68 | 70 | 67 |
| 100% modulus | (MPa) | 6.4 | 6.9 | 7.1 | 6.0 |
| Strength at break | (MPa) | 11.3 | 11.9 | 11.9 | 11.1 |
| Elongation at break | (%) | 160 | 160 | 160 | 180 |
| Air heating aging test (190° C., 200 hours) | | | | | |
| Hardness | (Duro A) | 70 | 70 | 72 | 69 |
| 100% modulus | (MPa) | 5.5 | 6.1 | 5.7 | 5.3 |
| Strength at break | (MPa) | 9.1 | 9.9 | 9.9 | 9.3 |
| Elongation at break | (%) | 160 | 160 | 170 | 170 |
| Air heating aging test (190° C., 300 hours) | | | | | |
| Hardness | (Duro A) | 73 | 75 | 75 | 74 |
| 100% modulus | (MPa) | 4.7 | 4.9 | 5.4 | 5.5 |
| Strength at break | (MPa) | 7.6 | 8.3 | 8.6 | 8.6 |
| Elongation at break | (%) | 160 | 170 | 170 | 160 |

TABLE 4-continued

| Measurement item | | Ex. 9 | Ex. 10 | Ex. 11 | Comp. Ex. 8 |
|---|---|---|---|---|---|
| Air heating aging test (190° C., 400 hours) | | | | | |
| Hardness change | (Duro A) | 78 | 78 | 79 | 81 |
| 100% modulus | (MPa) | 4.5 | 5.0 | 5.1 | 7.4 |
| Strength at break | (MPa) | 6.7 | 7.5 | 7.4 | 8.6 |
| Elongation at break | (%) | 170 | 160 | 160 | 120 |
| Air heating aging test (190° C., 500 hours) | | | | | |
| Hardness change | (Duro A) | 85 | 83 | 84 | 87 |
| 100% modulus | (MPa) | 5.0 | 5.3 | 5.8 | |
| Strength at break | (MPa) | 5.9 | 6.4 | 6.6 | 8.7 |
| Elongation at break | (%) | 130 | 130 | 120 | 80 |
| Air heating aging test (175° C., 250 hours) | | | | | |
| Hardness change | (Duro A) | 69 | 69 | 69 | 68 |
| 100% modulus | (MPa) | 6.9 | 7.2 | 7.6 | 5.8 |
| Strength at break | (MPa) | 11.5 | 12.2 | 12.4 | 10.9 |
| Elongation at break | (%) | 160 | 160 | 150 | 180 |
| Air heating aging test (175° C., 500 hours) | | | | | |
| Hardness change | (Duro A) | 67 | 72 | 71 | 64 |
| 100% modulus | (MPa) | 5.2 | 5.5 | 5.8 | 4.9 |
| Strength at break | (MPa) | 8.9 | 9.0 | 10.0 | 9.0 |
| Elongation at break | (%) | 170 | 160 | 170 | 180 |
| Air heating aging test (175° C., 750 hours) | | | | | |
| Hardness change | (Duro A) | 74 | 74 | 74 | 74 |
| 100% modulus | (MPa) | 5.2 | 5.5 | 5.9 | 5.5 |
| Strength at break | (MPa) | 8.6 | 8.9 | 9.1 | 8.8 |
| Elongation at break | (%) | 180 | 170 | 160 | 170 |
| Air heating aging test (175° C., 1000 hours) | | | | | |
| Hardness change | (Duro A) | 79 | 82 | 82 | 84 |
| 100% modulus | (MPa) | 5.5 | 5.7 | 6.0 | 7.8 |
| Strength at break | (MPa) | 7.7 | 7.9 | 8.2 | 9.2 |
| Elongation at break | (%) | 160 | 160 | 150 | 130 |

TABLE 5

| Measurement item | | Comp. Ex. 9 | Comp. Ex. 10 | Comp. Ex. 11 | Comp. Ex. 12 |
|---|---|---|---|---|---|
| Mooney scorch test (125° C.) | | | | | |
| ML min | (pts) | 51 | 51 | 52 | 50 |
| t5 | (min) | 3.6 | 3.6 | 3.5 | 3.0 |
| Crosslinking test (180° C.) | | | | | |
| tc (10) | (min) | 0.53 | 0.50 | 0.51 | 0.51 |
| tc (90) | (min) | 6.00 | 5.70 | 5.73 | 5.98 |
| ML | (N · m) | 0.24 | 0.24 | 0.24 | 0.23 |
| MH | (N · m) | 0.90 | 0.89 | 0.90 | 0.89 |
| Normal state physical properties (post cured) | | | | | |
| Hardness | (Duro A) | 63 | 62 | 62 | 62 |
| 100% modulus | (MPa) | 5.2 | 5.4 | 5.3 | 4.8 |
| Strength at break | (MPa) | 13.2 | 13.9 | 13.5 | 13.6 |
| Elongation at break | (%) | 200 | 200 | 190 | 210 |
| Air heating aging test (190° C., 100 hours) | | | | | |
| Hardness | (Duro A) | 65 | 65 | 65 | 63 |
| 100% modulus | (MPa) | 3.3 | 3.6 | 3.9 | 2.6 |
| Strength at break | (MPa) | 9.2 | 10.2 | 10.5 | 8.4 |
| Elongation at break | (%) | 240 | 240 | 240 | 290 |

TABLE 5-continued

| Measurement item | | Comp. Ex. 9 | Comp. Ex. 10 | Comp. Ex. 11 | Comp. Ex. 12 |
|---|---|---|---|---|---|
| Air heating aging test (190° C., 200 hours) | | | | | |
| Hardness | (Duro A) | 68 | 68 | 69 | 68 |
| 100% modulus | (MPa) | 2.8 | 3.0 | 3.2 | 2.4 |
| Strength at break | (MPa) | 7.0 | 7.4 | 7.7 | 6.2 |
| Elongation at break | (%) | 250 | 250 | 240 | 280 |
| Air heating aging test (190° C., 300 hours) | | | | | |
| Hardness | (Duro A) | 73 | 72 | 72 | 75 |
| 100% modulus | (MPa) | 2.5 | 2.6 | 2.8 | 3.0 |
| Strength at break | (MPa) | 5.6 | 5.9 | 6.2 | 5.8 |
| Elongation at break | (%) | 240 | 260 | 240 | 220 |
| Air heating aging test (190° C., 400 hours) | | | | | |
| Hardness change | (Duro A) | 76 | 77 | 80 | 79 |
| 100% modulus | (MPa) | 2.5 | 2.7 | 2.9 | 5.1 |
| Strength at break | (MPa) | 4.0 | 4.3 | 4.5 | 6.2 |
| Elongation at break | (%) | 230 | 220 | 210 | 130 |
| Air heating aging test (190° C., 500 hours) | | | | | |
| Hardness change | (Duro A) | 81 | 81 | 82 | 85 |
| 100% modulus | (MPa) | 3.0 | 3.1 | 3.6 | |
| Strength at break | (MPa) | 3.7 | 4.0 | 4.3 | 7.7 |
| Elongation at break | (%) | 160 | 170 | 150 | 80 |
| Air heating aging test (175° C., 250 hours) | | | | | |
| Hardness chang | (Duro A) | 64 | 64 | 65 | 59 |
| 100% modulus | (MPa) | 3.5 | 3.7 | 4.0 | 2.6 |
| Strength at break | (MPa) | 9.4 | 9.9 | 10.6 | 8.3 |
| Elongation at break | (%) | 230 | 230 | 230 | 270 |
| Air heating aging test (175° C., 500 hours) | | | | | |
| Hardness change | (Duro A) | 63 | 65 | 63 | 62 |
| 100% modulus | (MPa) | 2.8 | 2.8 | 3.2 | 2.5 |
| Strength at break | (MPa) | 7.2 | 7.2 | 8.1 | 6.3 |
| Elongation at break | (%) | 240 | 260 | 240 | 250 |
| Air heating aging test (175° C., 750 hours) | | | | | |
| Hardness change | (Duro A) | 69 | 69 | 71 | 72 |
| 100% modulus | (MPa) | 2.7 | 2.9 | 3.3 | 3.0 |
| Strength at break | (MPa) | 5.8 | 6.5 | 6.8 | 6.2 |
| Elongation at break | (%) | 270 | 250 | 250 | 240 |
| Air heating aging test (175° C., 1000 hours) | | | | | |
| Hardness change | (Duro A) | 78 | 80 | 79 | 83 |
| 100% modulus | (MPa) | 3.1 | 3.3 | 3.6 | 5.5 |
| Strength at break | (MPa) | 4.9 | 5.3 | 5.6 | 6.5 |
| Elongation at break | (%) | 210 | 210 | 220 | 130 |

TABLE 6

| Measurement item | | Ex. 12 | Comp. Ex. 13 | Comp. Ex. 14 | Comp. Ex. 15 |
|---|---|---|---|---|---|
| Mooney scorch test (125° C.) | | | | | |
| ML min | (pts) | 60 | 57 | 57 | 56 |
| t5 | (min) | 2.9 | 3.0 | 3.4 | 3.2 |
| Crosslinking test (180° C.) | | | | | |
| tc (10) | (min) | 0.59 | 0.58 | 0.54 | 0.53 |
| tc (90) | (min) | 6.39 | 6.40 | 5.90 | 6.02 |
| ML | (N · m) | 0.21 | 0.21 | 0.23 | 0.23 |
| MH | (N · m) | 0.80 | 0.80 | 0.87 | 0.87 |

TABLE 6-continued

| Measurement item | | Ex. 12 | Comp. Ex. 13 | Comp. Ex. 14 | Comp. Ex. 15 |
|---|---|---|---|---|---|
| Normal state physical properties (post cured) | | | | | |
| Hardness | (Duro A) | 64 | 63 | 65 | 65 |
| 100% modulus | (MPa) | 7.6 | 7.5 | 5.3 | 4.4 |
| Strength at break | (MPa) | 14.3 | 14.3 | 14.3 | 13.1 |
| Elongation at break | (%) | 170 | 180 | 210 | 230 |
| Air heating aging test (190° C., 100 hours) | | | | | |
| Hardness | (Duro A) | 73 | 69 | 70 | 66 |
| 100% modulus | (MPa) | 6.6 | 6.0 | 3.9 | 2.7 |
| Strength at break | (MPa) | 11.7 | 11.2 | 10.7 | 8.3 |
| Elongation at break | (%) | 180 | 180 | 250 | 300 |
| Air heating aging test (190° C., 200 hours) | | | | | |
| Hardness | (Duro A) | 73 | 72 | 67 | 63 |
| 100% modulus | (MPa) | 5.7 | 5.1 | 2.9 | 2.4 |
| Strength at break | (MPa) | 9.9 | 9.4 | 7.8 | 6.1 |
| Elongation at break | (%) | 180 | 190 | 270 | 300 |
| Air heating aging test (190° C., 300 hours) | | | | | |
| Hardness | (Duro A) | 75 | 77 | 73 | 76 |
| 100% modulus | (MPa) | 4.9 | 4.9 | 2.3 | 2.6 |
| Strength at break | (MPa) | 7.9 | 7.9 | 5.2 | 4.7 |
| Elongation at break | (%) | 170 | 180 | 290 | 280 |
| Air heating aging test (190° C., 400 hours) | | | | | |
| Hardness change | (Duro A) | 80 | 79 | 77 | 79 |
| 100% modulus | (MPa) | 4.7 | 5.8 | 2.4 | 3.4 |
| Strength at break | (MPa) | 7.3 | 7.9 | 4.4 | 5.3 |
| Elongation at break | (%) | 180 | 150 | 280 | 210 |
| Air heating aging test (190° C., 500 hours) | | | | | |
| Hardness change | (Duro A) | 85 | 85 | 80 | 85 |
| 100% modulus | (MPa) | 4.8 | 7.7 | 2.6 | 5.3 |
| Strength at break | (MPa) | 6.1 | 8.3 | 3.7 | 6.1 |
| Elongation at break | (%) | 150 | 110 | 240 | 140 |

The invention claimed is:

1. A crosslinkable acrylic rubber composition comprising:

(A) acrylic rubber containing a carbamic acid ester group and a carboxyl group;

(B) a phenothiazine-based antioxidant represented by the following general formula [I]:

(I)

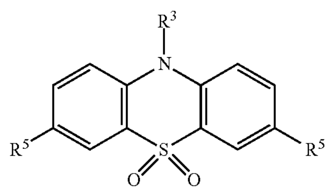

[wherein $R^3$ is a hydrogen atom, a monovalent aliphatic hydrocarbon group having 1 to 20 carbon atoms, an aralkyl group having 7 to 20 carbon atoms, or an acyl group represented by the following general formula:

(II)

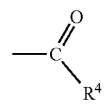

(wherein $R^4$ is a monovalent aliphatic hydrocarbon group having 1 to 20 carbon atoms), and $R^5$ is an aralkyl group having 7 to 20 carbon atoms]; and (C) a crosslinking accelerator.

2. The crosslinkable acrylic rubber composition according to claim 1, wherein the component (A) is an acrylic rubber obtained by copolymerization of monomers in the following weight percentages: 90 to 99.8 wt % of an alkyl (meth) acrylate and/or alkoxyalkyl (meth)acrylate monomer, 0.1 to 5 wt % of an α,β-unsaturated carboxylic acid monomer, and 0.1 to 5 wt % of a carbamic acid ester group-containing (meth)acrylate monomer represented by the general formula:

(III)

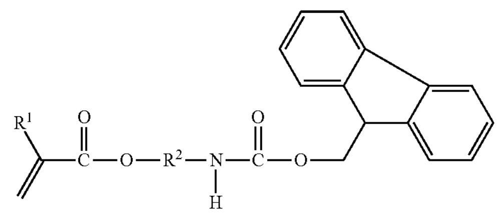

wherein $R^1$ is a hydrogen atom or a methyl group, and $R^2$ is a divalent aliphatic hydrocarbon group having 1 to 10 carbon atoms.

3. The crosslinkable acrylic rubber composition according to claim 1, wherein the component (A) is a mixture of acrylic rubber (a) obtained by copolymerization of monomers in the following weight percentages: 90 to 99.9 wt % of an alkyl (meth)acrylate and/or alkoxyalkyl (meth) acrylate monomer and 0.1 to 10 wt % of a carbamic acid ester group-containing (meth)acrylate monomer represented by the general formula:

(III)

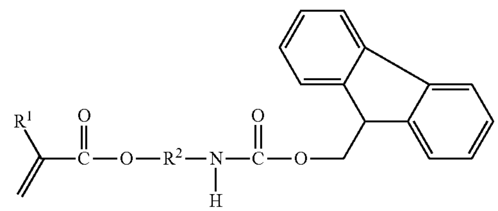

wherein $R^1$ is a hydrogen atom or a methyl group, and $R^2$ is a divalent aliphatic hydrocarbon group having 1 to 10 carbon atoms, and acrylic rubber (b) obtained by copolymerization of monomers in the following weight percentages: 90 to 99.9 wt % of an alkyl (meth)acrylate and/or alkoxyalkyl (meth) acrylate monomer and 0.1 to 10 wt % of an α,β-unsaturated carboxylic acid monomer, wherein amount of the acrylic rubber (a) is 90 to 10 wt %, and amount of the acrylic rubber (b) is 10 to 90 wt %, based on total amount of the acrylic rubber (a) and acrylic rubber (b).

4. The crosslinkable acrylic rubber composition according to claim 2, wherein the alkyl (meth)acrylate comprises ethyl acrylate.

5. The crosslinkable acrylic rubber composition according to claim 2, wherein the α,β-unsaturated carboxylic acid monomer is a monoalkyl ester of an α,β-unsaturated dicarboxylic acid monomer.

6. The crosslinkable acrylic rubber composition according to claim 3, wherein the alkyl (meth)acrylate comprises ethyl acrylate.

7. The crosslinkable acrylic rubber composition according to claim 3, wherein the α,β-unsaturated carboxylic acid monomer is a monoalkyl ester of an α,β-unsaturated dicarboxylic acid monomer.

* * * * *